US008254683B2

(12) United States Patent
Yamaguchi et al.

(10) Patent No.: US 8,254,683 B2
(45) Date of Patent: Aug. 28, 2012

(54) CODE IMAGE PROCESSING METHOD

(75) Inventors: Nobuyasu Yamaguchi, Kawasaki (JP);
Hirotaka Chiba, Kawasaki (JP); Tsugio Noda, Hadano (JP)

(73) Assignee: Fujitsu Limited, Kawasaki (JP)

( * ) Notice: Subject to any disclaimer, the term of this patent is extended or adjusted under 35 U.S.C. 154(b) by 1075 days.

(21) Appl. No.: 11/856,333

(22) Filed: Sep. 17, 2007

(65) Prior Publication Data
US 2008/0069398 A1 Mar. 20, 2008

Related U.S. Application Data

(63) Continuation of application No. PCT/JP2005/004955, filed on Mar. 18, 2005.

(51) Int. Cl.
*G06K 9/00* (2006.01)
*G06K 7/10* (2006.01)
*G06K 9/18* (2006.01)

(52) U.S. Cl. ............. 382/181; 235/462.09; 235/454

(58) Field of Classification Search .................. None
See application file for complete search history.

(56) References Cited

U.S. PATENT DOCUMENTS

| 5,457,309 | A | * | 10/1995 | Pelton | 235/462.28 |
|---|---|---|---|---|---|
| 5,525,787 | A | * | 6/1996 | Kubo | 235/462.09 |
| 5,691,527 | A | * | 11/1997 | Hara et al. | 235/456 |
| 6,282,319 | B1 | | 8/2001 | Tatsuta | |
| 6,325,287 | B1 | | 12/2001 | Nakajima et al. | |
| 7,077,323 | B2 | * | 7/2006 | Takakura et al. | 235/462.25 |
| 7,350,710 | B2 | * | 4/2008 | Sakai et al. | 235/462.09 |
| 7,764,835 | B2 | * | 7/2010 | Takakura et al. | 382/168 |
| 2002/0051573 | A1 | * | 5/2002 | Sakai et al. | 382/194 |
| 2004/0026508 | A1 | * | 2/2004 | Nakajima et al. | 235/454 |
| 2004/0074967 | A1 | * | 4/2004 | Takakura et al. | 235/462.08 |
| 2005/0121520 | A1 | * | 6/2005 | Yamaguchi et al. | 235/462.09 |
| 2005/0194445 | A1 | * | 9/2005 | Takakura et al. | 235/462.1 |

FOREIGN PATENT DOCUMENTS

| EP | 1619604 A2 | 1/2006 |
| JP | 8180125 A | 7/1996 |
| JP | 10198754 A | 7/1998 |
| JP | 1115911 A | 1/1999 |

(Continued)

OTHER PUBLICATIONS

Japanese Office Action dated Feb. 2, 2010, issued in corresponding Japanese Patent Application No. 2007-509074.
JIS (Japanese Industrial Standard) X0510 "Two-dimensional symbol-QR Code-Basic Specification", Partial English Translation.
European Office Action dated May 31, 2010, issued in corresponding European Patent Application No. 05726725.4.

(Continued)

*Primary Examiner* — Yuzhen Ge
(74) *Attorney, Agent, or Firm* — Westerman, Hattori, Daniels & Adrian, LLP

(57) ABSTRACT

When a small block area enters a first two-dimensional code during a scan and features of the image within the area of a position in the first two-dimensional code coincide with a two-dimensional code, the block area is specified as containing a code and a recognition process is performed in the nearby areas. When the recognition of the two-dimensional code has been successful, the area of the first two-dimensional code is further extracted. When the extraction of the area of the first two-dimensional code has been successful, the scan using the small block area is further continued to search for a second two-dimensional code. With an already recognized entrance to the area of the first two-dimensional code, the area is skipped to continue the search. The second two-dimensional code is detected at a high speed by repeating the operation.

7 Claims, 32 Drawing Sheets

FOREIGN PATENT DOCUMENTS

| | | |
|---|---|---|
| JP | 2000148904 A | 5/2000 |
| JP | 2000339407 A | 12/2000 |
| JP | 2001-307014 A | 11/2001 |
| JP | 2001307014 A | 11/2001 |
| JP | 2002-133364 A | 5/2002 |
| JP | 2004-078896 A | 3/2004 |
| JP | 2005173646 A | 6/2005 |

OTHER PUBLICATIONS

European Search Report dated Oct. 16, 2009, issued in corresponding European Patent Application No. 05726725.4.

International Search Report of PCT/JP2005/004955, date of mailing Jun. 28, 2005.

* cited by examiner

ONE-DIMENSIONAL CODE
TWO-DIMENSIONAL CODE
F I G. 4

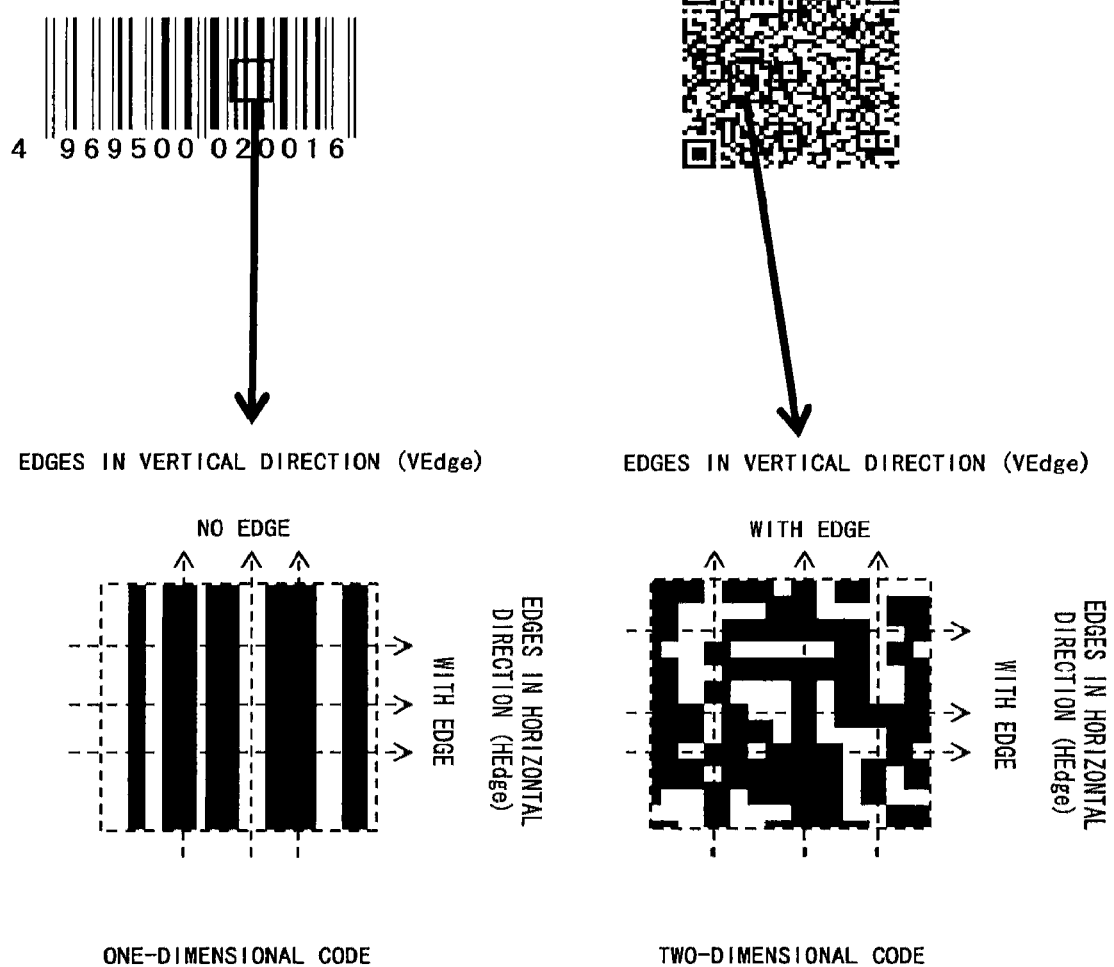
F I G. 5

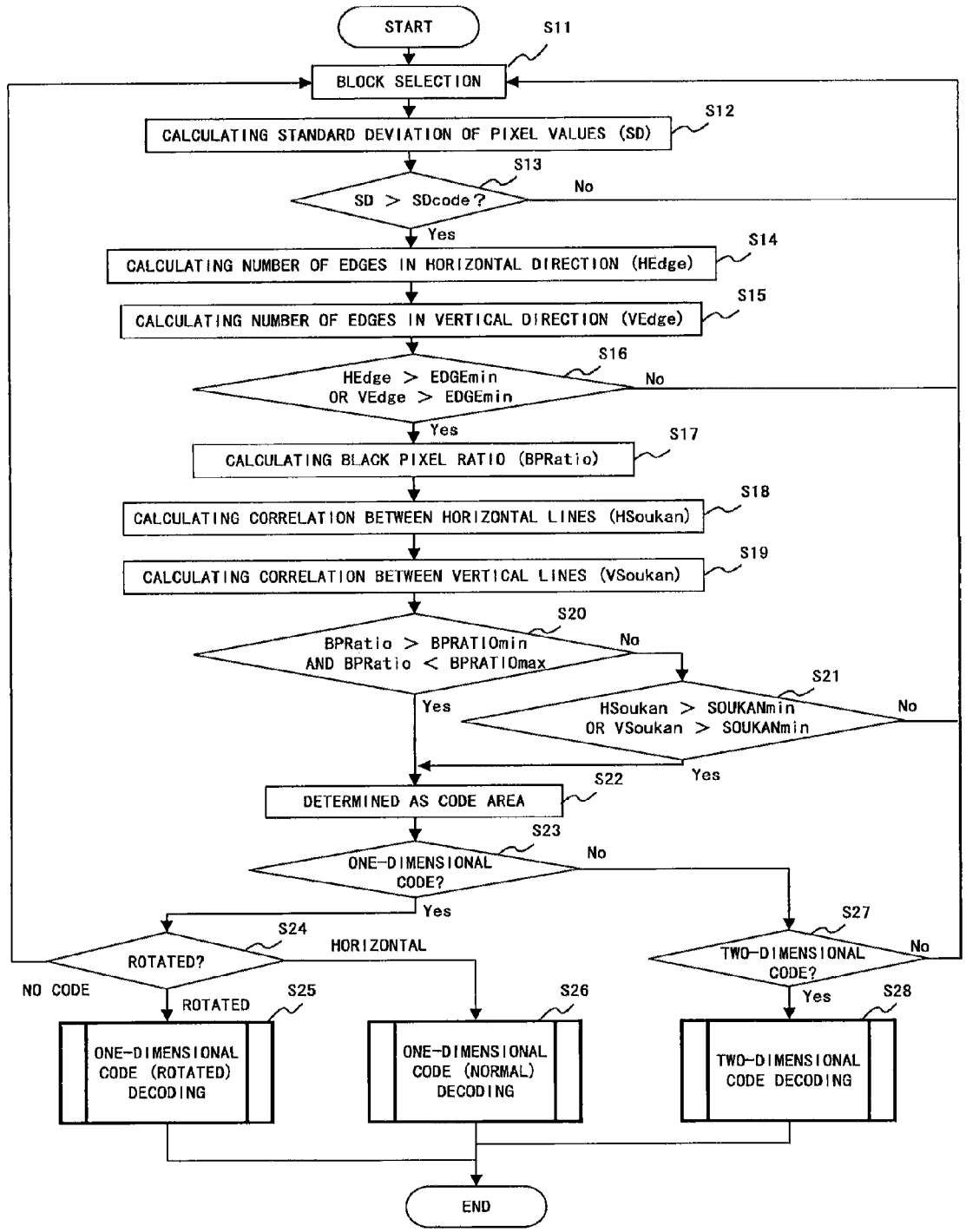
F I G. 8

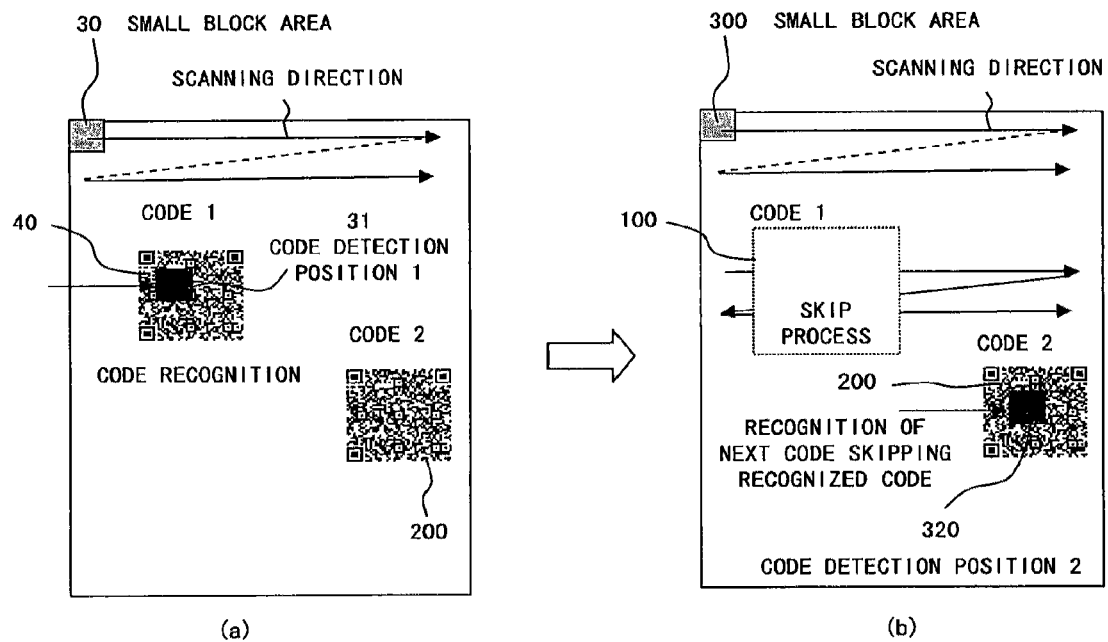
F I G. 1 2

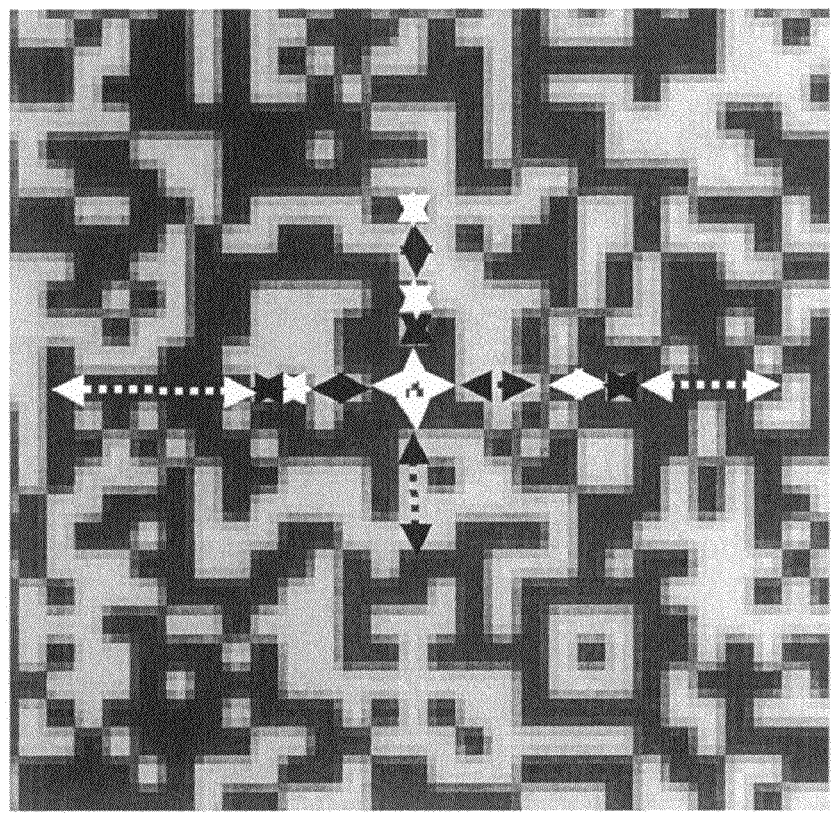
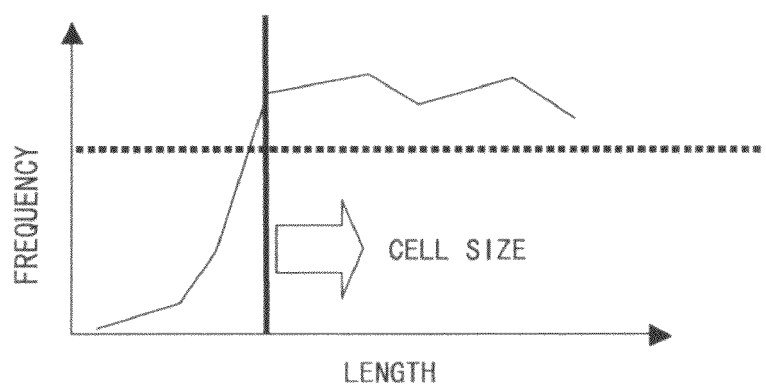
FIG. 14

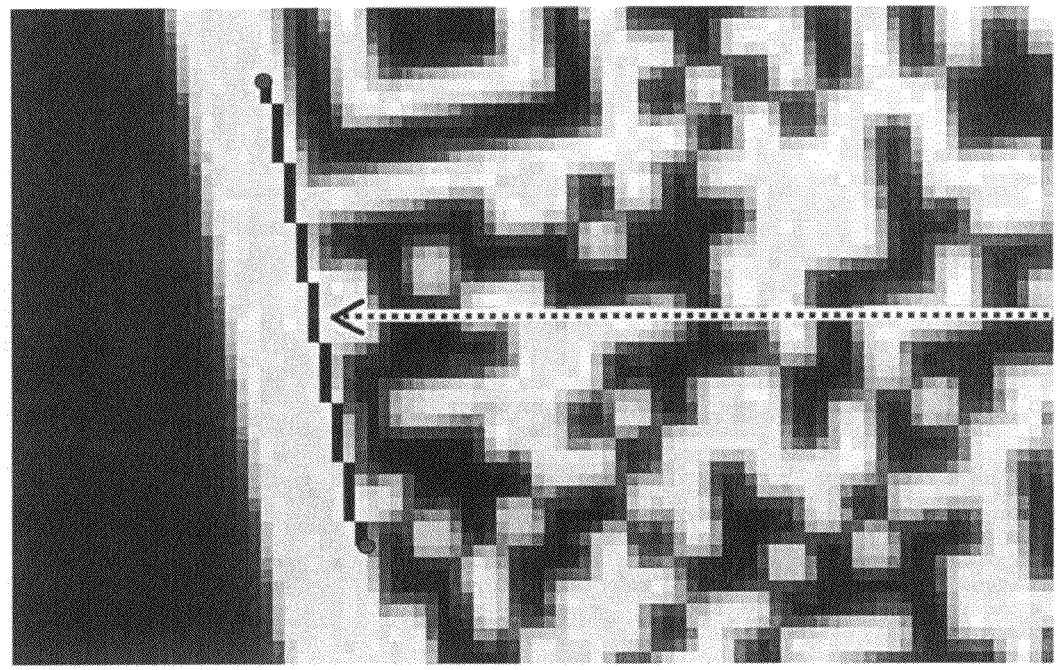
F I G. 18

SETTING THRESHOLD VALUE WITHIN CERTAIN AREAS

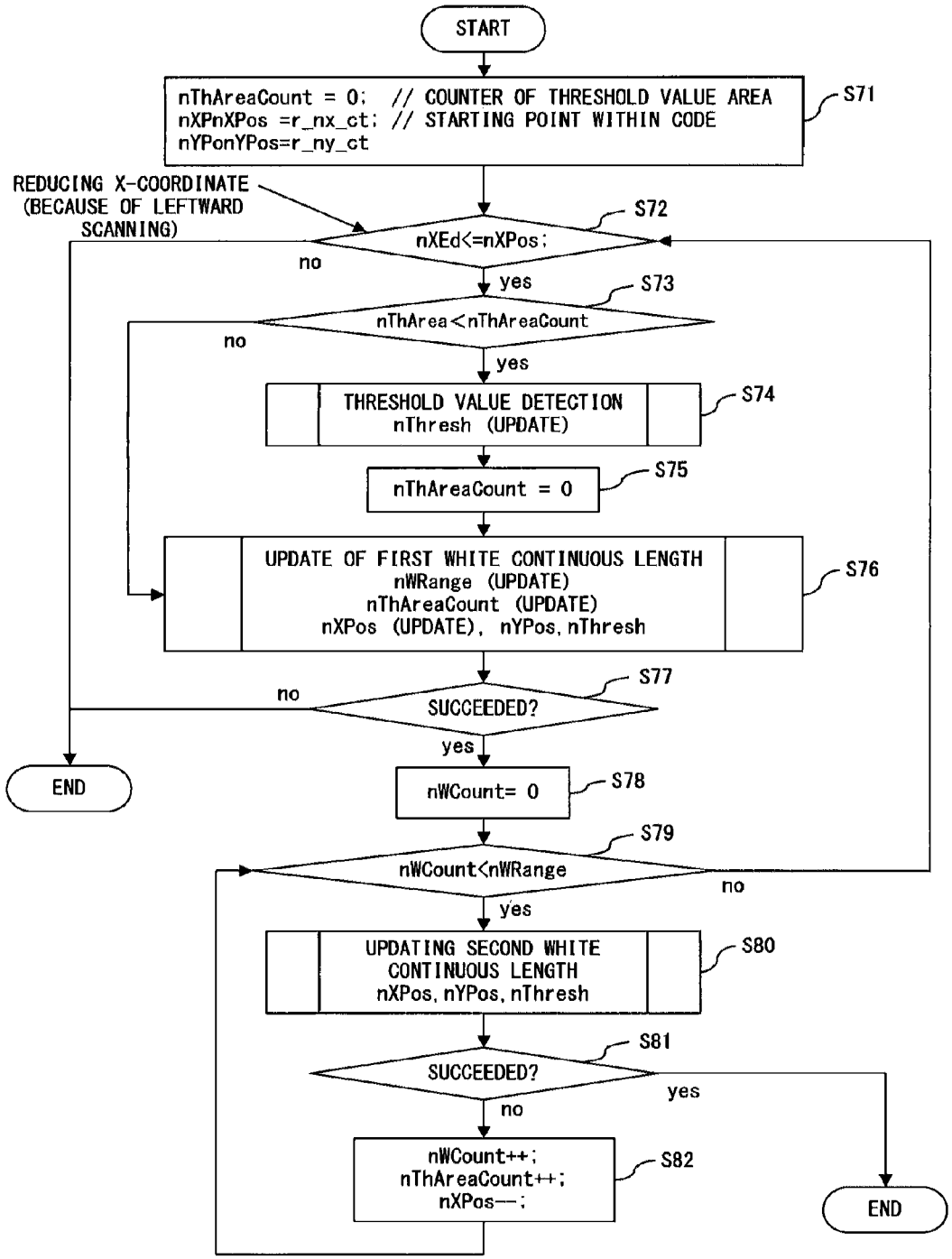
F I G. 2 3

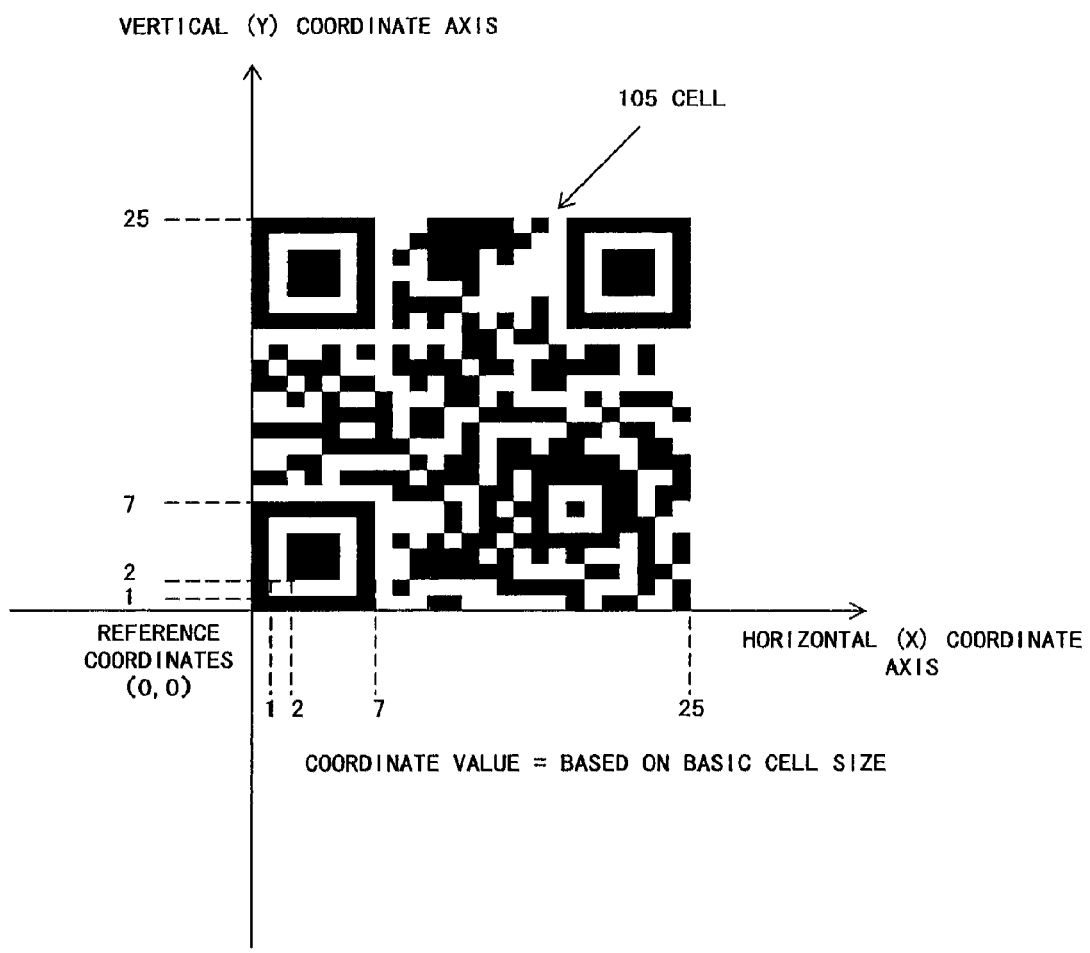
F I G. 2 8

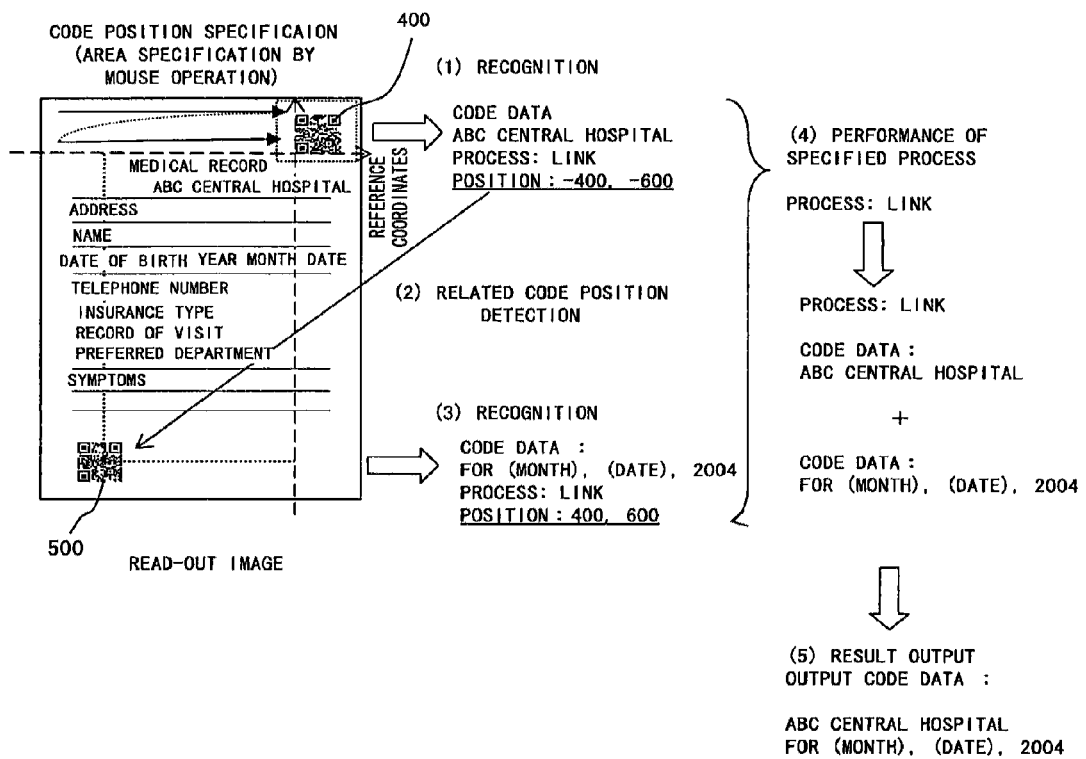
F I G. 30

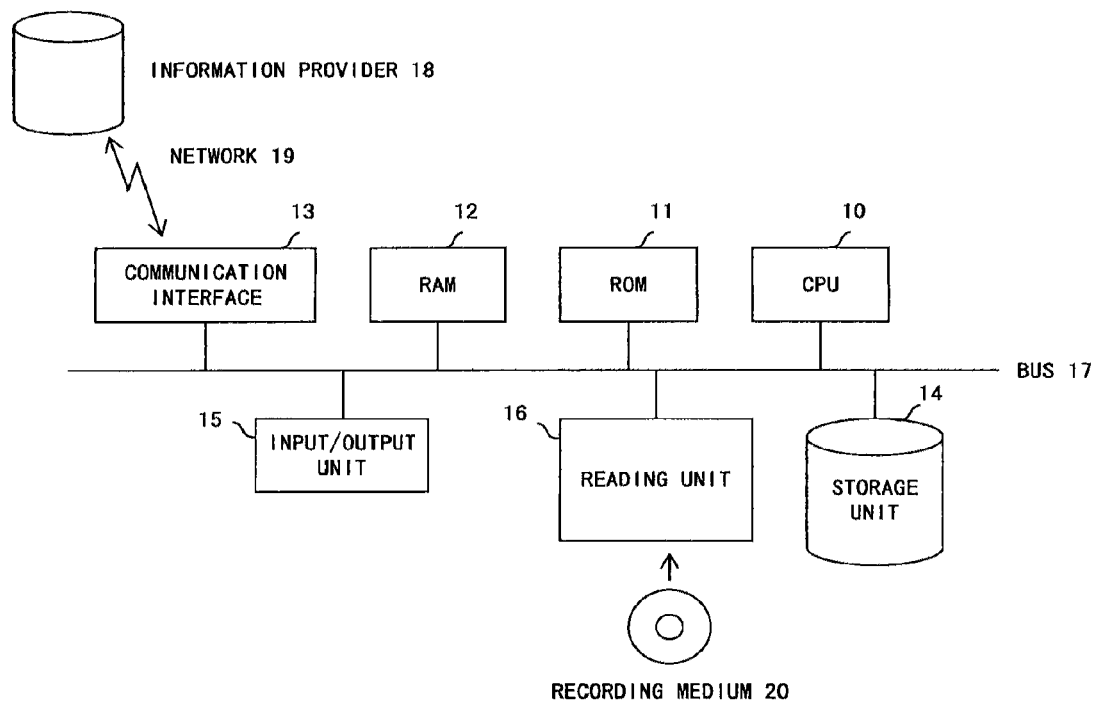
F I G. 3 2

CODE IMAGE PROCESSING METHOD

CROSS REFERENCE TO RELATED APPLICATION

This application is a continuation of the PCT application PCT/JP2005/004955 which was filed on Mar. 18, 2005.

BACKGROUND OF THE INVENTION

1. Field of the Invention

The present invention relates to a code image processing method for recognizing a plurality of codes and processing them together in digital image data with a plurality of codes arranged with characters and figures, and in image data read out from a document with a plurality of printed codes using an image reading device such as a digital camera and a scanner.

2. Description of the Related Art

In recent years, the popularity of two-dimensional bar codes (unless specifically noted, hereinafter referred to as "two-dimensional codes"), which can be embedded with more information than one-dimensional bar codes (unless specifically noted, hereinafter referred to as a "one-dimensional codes"), has been growing. Since two-dimensional codes cannot be recognized unless the data of the entire code is arranged two-dimensionally, image reading devices such as digital cameras, image scanners and the like have been used as reading devices.

The growing popularity of two-dimensional codes has also increased the usage of such devices not only for reading codes printed on labels for exclusive use, but also for reading codes in situations in which a given size of code is printed in a given position with characters and figures. There has also been an increase in the usage in which a plurality of two-dimensional codes are used by arranging and printing them on a single document.

FIG. 1 is a diagram showing an outline of a conventional code image processing method for recognizing a two-dimensional code from image data having a two-dimensional code called a quick response (QR) code (See Non-patent Document 1) in which code positioning symbols are placed in the upper right, upper left and lower left of the code area. Conventionally, in FIG. 1, the image data is progressively scanned one small block area 30 at a time from the upper left corner in the transverse direction. When the small block area 30 enters the space of a first two-dimensional code 40 during the scan and features of the image within the area at a position 31 in the first two-dimensional code 40 coincide with a two-dimensional code, the block area is specified as containing a code and a recognition process is performed in the areas near this block area. In cases such as this one, as shown in FIG. 1(a), there has been a problem in that even when there are a plurality of codes, recognition can only be performed for the code specified first, since when the recognition is completed, the process is terminated. There has also been a problem such that, as shown in FIG. 1(b), when the scanning is continued after the recognition and there are a plurality of small block areas 30 within the first two-dimensional code 40, multiple recognitions of the same code occur since the recognition process is carried out again because the features of the image within the area at a position 32 also coincide with a two-dimensional code. (See Patent Document 1.)

FIG. 2 is a diagram showing the outline of a conventional code image processing method for recognizing a two-dimensional code using, separately from image data with a QR code (FIG. 2(a)), a layout template recording position information of a code contained in the image data. In the example of the conventional method, as shown in FIG. 2, layout templates 80 and 90 (FIG. 2(b)) recording position information of codes 60 and 70 contained in the image data are separately provided, and the template information is referred to in the recognition process (FIG. 2(c)). In this case, a problem has arisen such that a template has to be separately created and selected every time in accordance with the document to be read. Furthermore, another problem has arisen such that read-out image data and the template have to be accurately aligned, and images have to be read using a method in which no rotation or distortion occurs in the image data. (See Patent Document 2.)

When a digital camera or an image scanner reads a document in which a given number of codes are printed in given positions with characters and figures, parts of the characters and figures are disadvantageously taken in as image data along with the two-dimensional code. For this reason, in order to recognize two-dimensional codes contained in image data, it is necessary to specify the position of each code first, and to then progressively perform a code recognition process in the areas nearby the specified position.

Patent Document 1: Japanese Patent Application filed No. 2003-408104 (Japanese Patent Application No. 2005-173646)

Patent Document 2: Japanese Patent Application No. 2000-339407 (column 2, line 50—column 3, line 20, FIG. 5)

Non-patent Document 1: JIS X0510 Two-dimensional code symbol—QR Code—Fundamental Specification Description

SUMMARY OF THE INVENTION

A code image processing method according to the present invention comprises a block selection process selecting a rectangular block from image data, a block judgment process judging whether the selected block satisfies a predetermined condition, a code determination process determining the type and properties of a code contained in the block satisfying the predetermined condition, a code recognition process recognizing the code of which type and properties are determined, and a block scan control process controlling a block scan procedure on the basis of the code recognition result.

According to the present invention, even when image data contains a plurality of codes, the search and recognition of all codes can be accurately performed, since the code determination process and code recognition process in a recognized area are skipped without stopping when a code recognized area are skipped without stopping when a code recognition is performed. In addition, since the position of a code can be detected and recognized without separately creating a template, the recognition can be correctly performed even when read-out data has a tilt or is out of alignment.

BRIEF DESCRIPTION OF THE DRAWINGS

FIG. 4 is a diagram showing typical examples of a one-dimensional code and a two-dimensional code.

FIG. 5 is a diagram depicting a code determination method using the number of edges.

FIG. 8 is an overall flowchart of a determination method of the type and the properties of a code.

FIG. 12 is a diagrammatic illustration of the code image processing method according to the first embodiment of the present invention.

FIG. 14 is a diagram depicting a detection method for detecting the size of a cell.

FIG. 18 is a diagram depicting a detection operation of the second white continuous length on a code boundary.

FIG. 23 is an overall flowchart of the code boundary detection process.

FIG. 28 is a diagram depicting the setting of reference coordinates according to the second embodiment of the present invention.

FIG. 30 is a diagrammatic illustration of a code image processing method according to a third embodiment of the present invention.

FIG. 32 is a diagram depicting the loading of a program according to the present invention into a computer.

DESCRIPTION OF THE PREFERRED EMBODIMENTS

Figure 1:
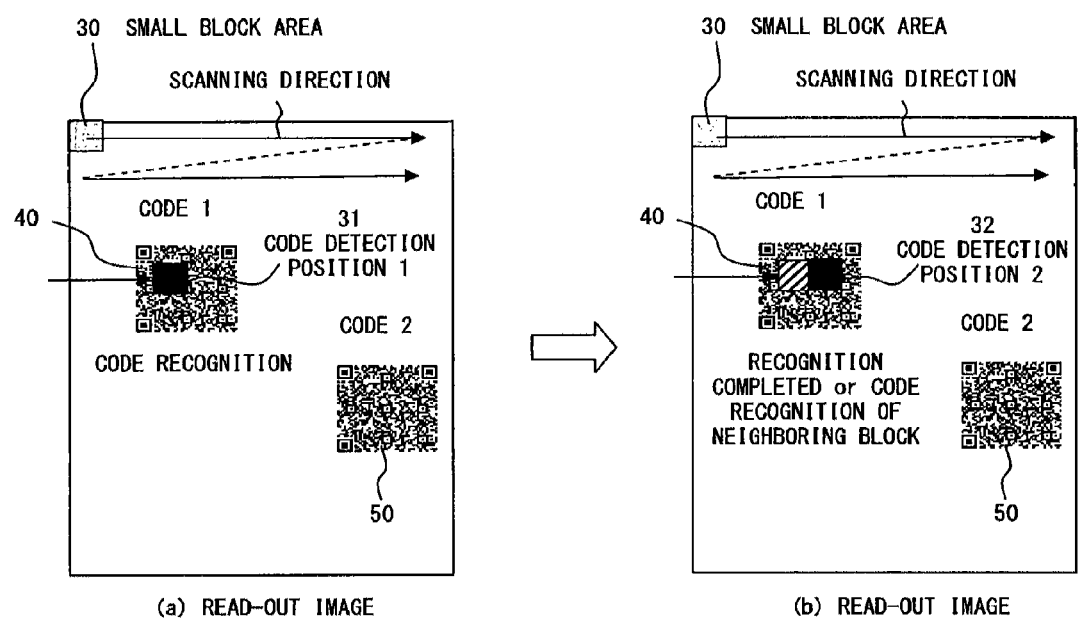
FIG. 1 is a diagrammatic illustration of a conventional code image processing method.
Figure 2:
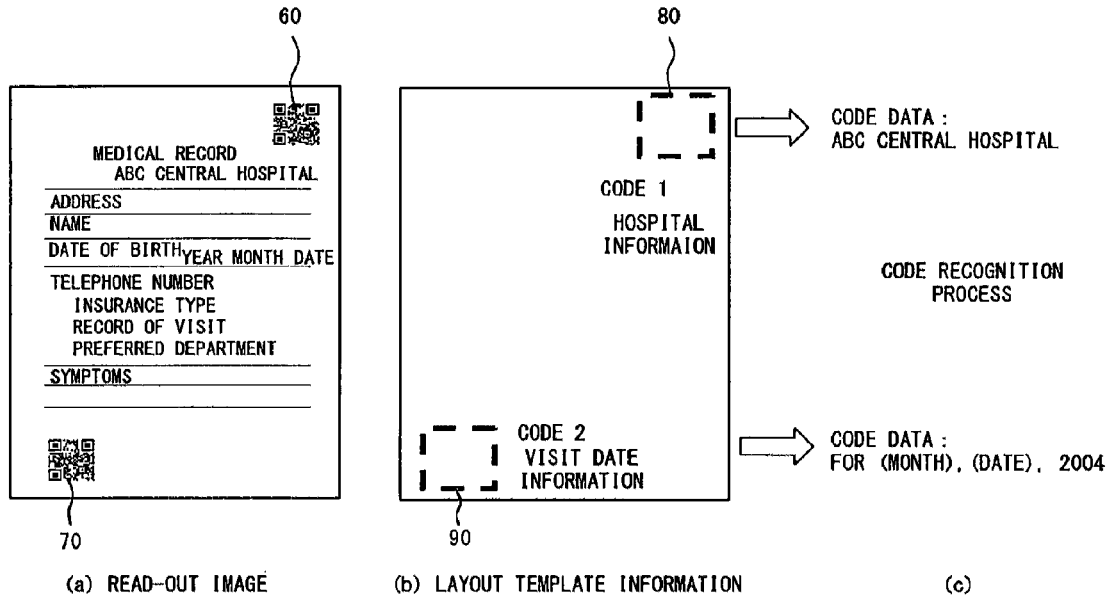
FIG. 2 is a diagrammatic illustration of a conventional code image processing method for recognizing a two-dimensional code using layout template information for recording position information of a code.

Hereinafter, embodiments of the present invention will be explained by referring to the drawings.

[First Embodiment]

Figure 3:
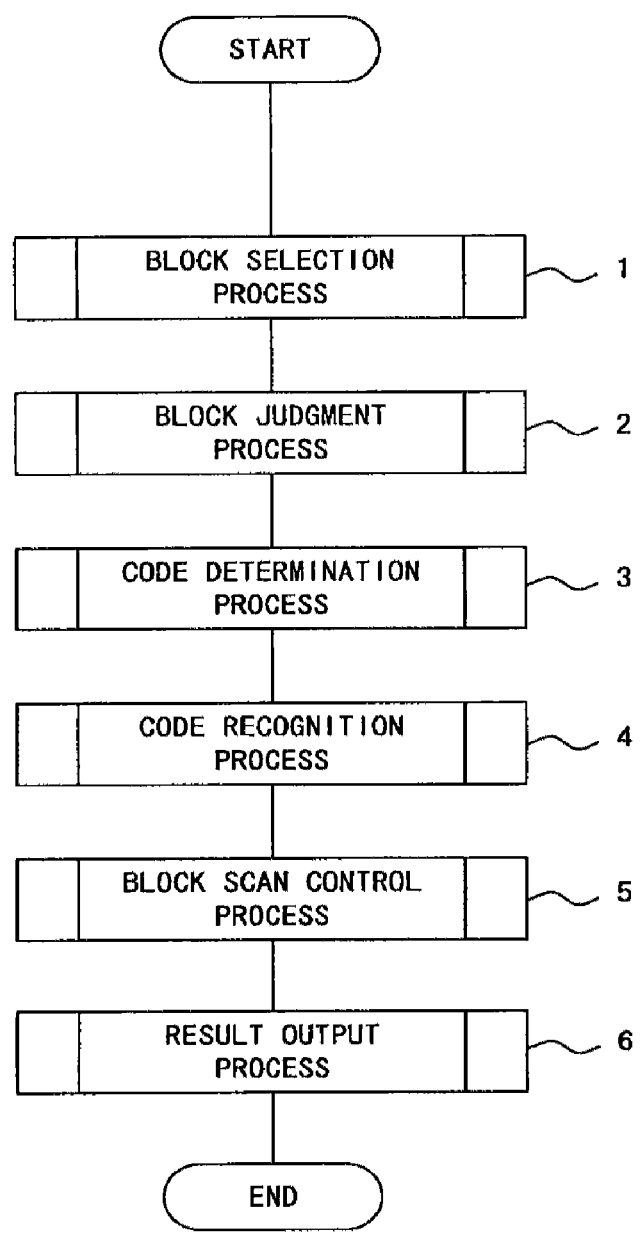
FIG. 3 is a diagram depicting the principle of a code image processing method according to a first embodiment of the present invention.

FIG. 3 is a diagram depicting the principle of a code image processing method according to a first embodiment of the present invention. In FIG. 3, the basic processing block according to the present invention comprises a block selection process 1 selecting a rectangular block from image data, a block judgment process 2 judging whether the selected block satisfies a predetermined condition, a code determination process 3 determining the type and properties of a code contained in the block satisfying the predetermined condition, a code recognition process 4 recognizing the code of which type and properties are determined, and a block scan control process 5 controlling a block scan procedure on the basis of the code recognition result. After the completion of the recognition process of all codes by the block scan controlled by the block scan control process 5, the result is outputted in a result output process 6.

In the block selection process 1 according to this embodiment, image data is scanned by segmenting the image data into small block areas (in units of rectangular blocks), and a code is searched for by selecting a block. Next, in the block judgment process 2, a judgment is made as to whether the variance of the gradient values of pixels in the block is within a predetermined range or whether the ratio of black pixels to white pixels in the block is within a predetermined range.

In the code determination process 3, whether the code type is one-dimensional or two-dimensional is determined. When it is determined to be one-dimensional, the properties of one-dimensional code, for example whether or not it is in a rotated state, is determined. When it is determined that the block area contains a code in the code determination process 3, the recognition of the code is conducted in the code recognition process 4. In the block scan control process 5 according to this embodiment, the procedure of the block scan is controlled on the basis of the code recognition result in the code recognition process 4, which will be described in detail using the flowchart shown in FIG. 26.

FIG. 4 is a diagram showing typical examples of a one-dimensional code and a two-dimensional code. A one-dimensional code is made up of a combination of parallel straight lines with different sizes and intervals, and a two-dimensional code is created by dividing data into cells and arranging them in two dimensions, a single cell generally corresponding to a plurality of pixels. The two-dimensional code in FIG. 4 is called a quick response (QR) code, in which code positioning symbols are placed in the upper right, upper left and lower left of the code area.

As shown in FIG. 4, the one-dimensional code and two-dimensional code are printed using two colors with a large contrast difference, such as black and white. The two colors are arranged so that the ratio of the areas occupied by the two colors approximates 1 to 1. Therefore, the variation (distribution) or standard deviation of the gradient values of the pixels is large.

On the other hand, in an area with a printed character, the ratio of the area occupied by the color of the character to the background decreases, and the variation of the gradient values of the pixels is also small. In an area with a printed photograph or the like, the gradient values of the pixels assume arbitrary values, and the variation of the gradient values is small. By utilizing this feature, whether the area contains a one-dimensional code or a two-dimensional code can be determined by detecting a block in which the variation of the gradient values of the pixels is within a predetermined range.

The two-dimensional code is especially created so that in the code area, the ratio of the white area to the black area is within a predetermined range, for example within 50%±10%. Therefore, it can be ensured that only an area containing a two-dimensional code has been detected by detecting a block in which the ratio of the while pixels to the black pixels is within a predetermined range.

FIG. 5 is a diagram depicting a code determination method using the number of edges. In a one-dimensional code, since data is expressed with the combination of parallel straight lines, when pixels are picked up on a line perpendicular to the bars, there exist points (edges) where the gradient values of the pixels on the line abruptly change, corresponding to the number of bars orthogonal to the line, regardless of the position of the line within the code, whereas no edge exists when pixels are picked up on a line parallel to the bars.

Meanwhile, in a two-dimensional code, since data is expressed by the combination of contrasting dots (cells) arranged in two dimensions and the contrast is made as uniform as possible within a particular code, there are few differences in the number of edges in pixels picked up on a horizontal line and pixels picked up on a vertical line, the edges being the points where the gradient values of the pixels abruptly change. When pixels are picked up on a line in an area with a printed character, there are some places such as the spaces between characters/lines where no edges exist, the feature being apparently different from that of a code area.

Therefore, according to this embodiment, a highly accurate detection of only areas containing a one-dimensional or two-dimensional code can be obtained by identifying blocks in which the number of edges on horizontal/vertical lines is within a predetermined range. In addition, one-dimensional codes and two-dimensional codes can easily be distinguished from each other.

Figure 6:
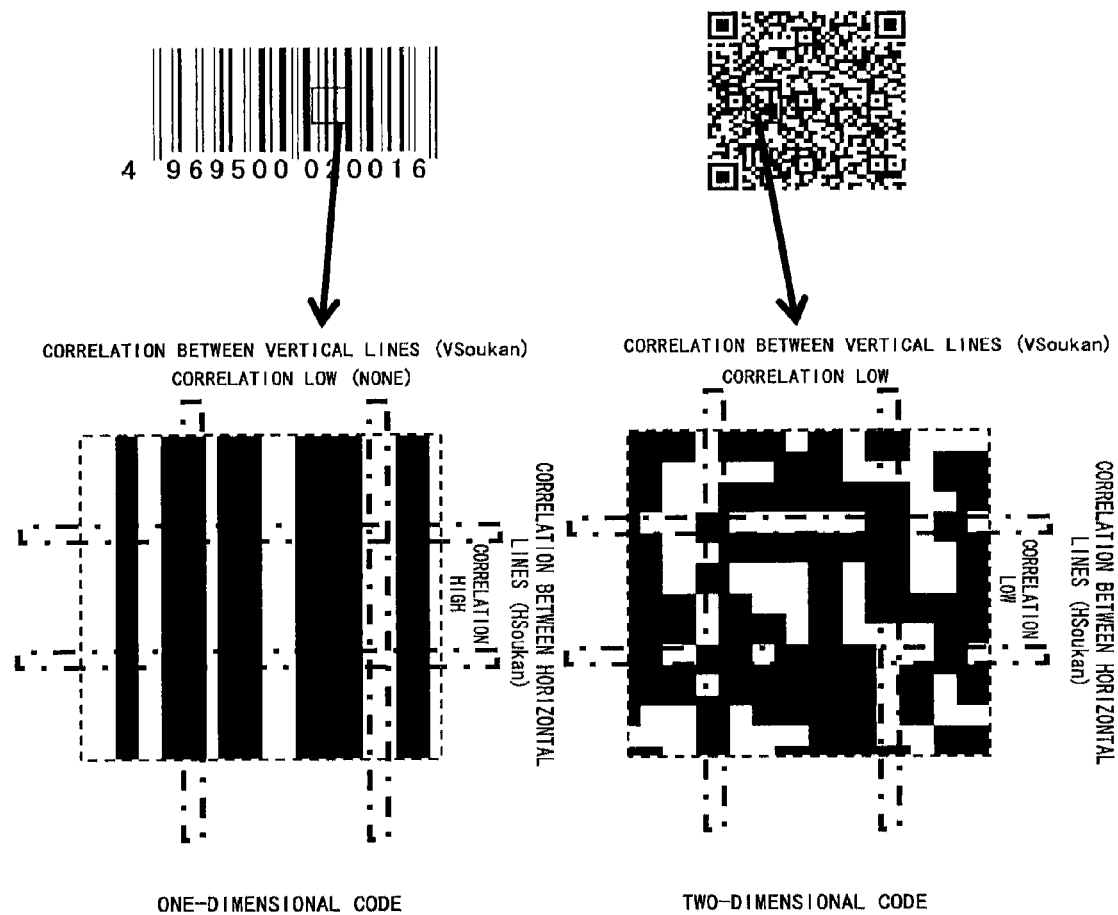
FIG. 6 is a diagram depicting a code determination method using the correlation between lines.

FIG. 6 is a diagram depicting a code determination method using the correlation between lines. A one-dimensional code has the feature that the cross-correlation value within the code area between a straight line perpendicular to the bars and a nearby straight line parallel to this perpendicular line (both lines being oriented horizontally) is high, while the cross-correlation value between a straight line parallel to the bars and a nearby straight line parallel to this parallel line (both lines being oriented vertically) is low. FIG. 6 assumes two lines within the black bars or white bars as the two vertical lines, while the feature mentioned above is similar in the case where the cross-correlation is obtained between lines passing horizontally through the black bars and white bars.

By contrast, in a two-dimensional code, the cross-correlation value is low both between two parallel horizontal lines and between two parallel vertical lines. Even an area containing a printed character or photograph will not show as strong a correlation as is shown in a one-dimensional code.

Therefore, a highly accurate detection of only areas containing a one-dimensional or two-dimensional code can be obtained by identifying blocks in which the correlation value between parallel/vertical lines is within a predetermined range, and further one-dimensional codes and two-dimensional codes can easily be distinguished from each other.

Figure 7:
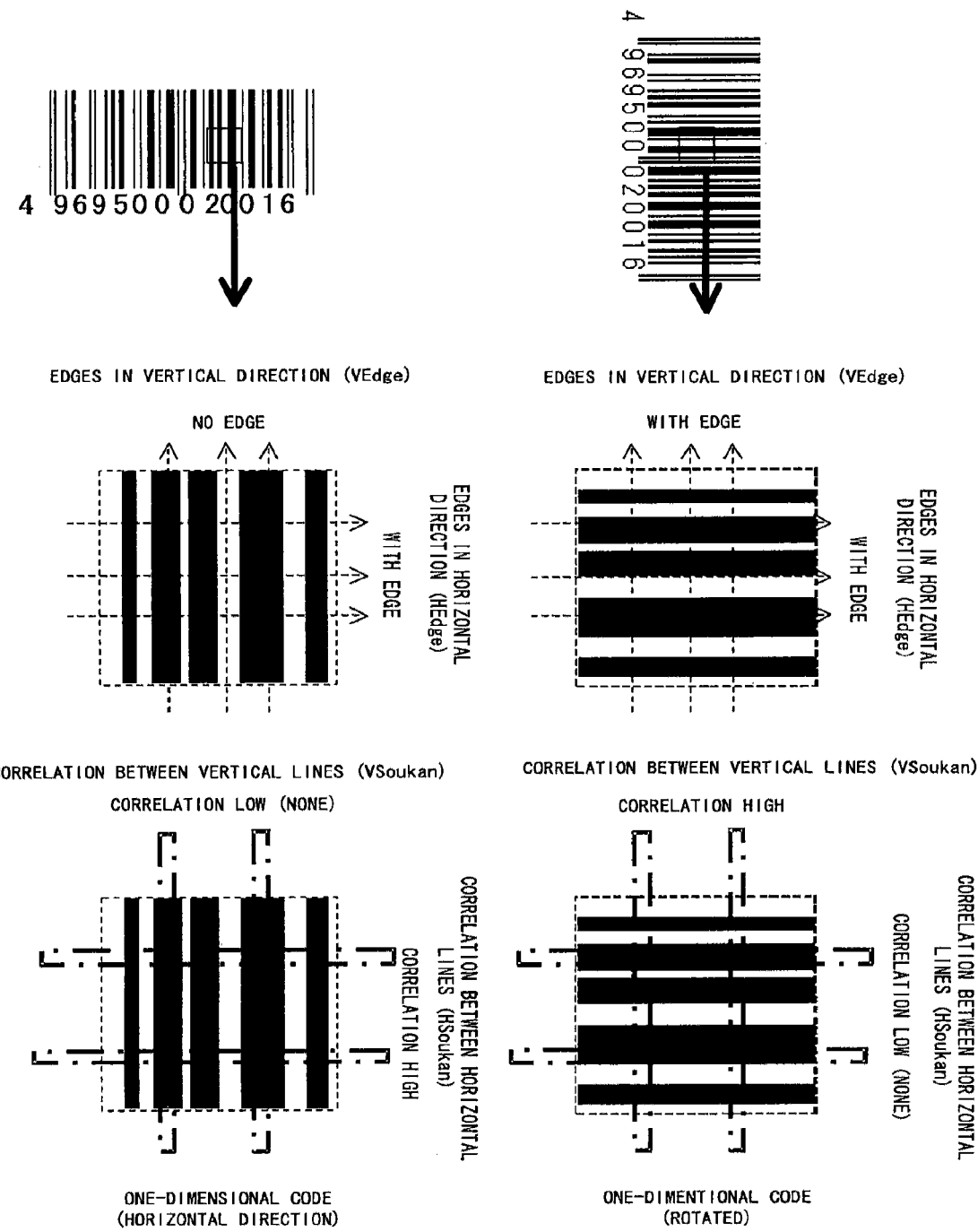
FIG. 7 is a diagram depicting a determination method for determining the presence/absence of rotation in a one-dimensional code.

FIG. 7 is a diagram depicting a determination method for determining the presence/absence of rotation in a one-dimensional code. As described above, in a one-dimensional code, the bar code recognition process is conducted using the data for a line in the direction orthogonal to the bars constituting the code. However, when the one-dimensional code is rotated 90 degrees, the code cannot be accurately recognized, since the direction of the line becomes parallel to the direction of the bars. Thus, there is a need for detecting the rotation of the code.

In FIG. 7, when a one-dimensional code is in the original orientation, namely the horizontal direction, the number of edges in the horizontal direction corresponds to the number of the white bars and black bars, whereas the number of edges in the vertical direction is zero. In addition, the correlation between horizontal lines is high, whereas the correlation between vertical lines is low.

By contrast, when the one-dimensional code is rotated 90 degrees, the number of edges in the vertical direction corresponds to the number of the white bars and black bars, with a low correlation between horizontal lines and a high correlation between vertical lines.

The above features make it possible to detect with a high accuracy in image data whether a one-dimensional code is in the horizontal direction or has been rotated 90 degrees.

In an actual code judgment, a highly accurate detection of only areas containing a one-dimensional or two-dimensional code can be obtained by combining two or more of the judgment conditions described above. Meanwhile, the value ranges of the number of black and white pixels, the number of edges, and the correlation etc. might differ to some extent between a one-dimensional code and a two-dimensional code. However, this embodiment is described assuming that the process is conducted without any distinction of the predetermined range for each value between one-dimensional codes and two-dimensional codes. This eliminates the need for the separation of processes for judging each of these code types, and code determination can be performed at a high speed with a simple process as a result.

FIG. 8 is an overall flowchart of a determination method of the type and properties of a code. With the start of the processes in FIG. 8, a block of interest is selected from input image data (S11). The block is selected in series starting from a given position in the image. The selection is generally made during a progressive scan from the upper left corner, or the scan is often conducted from the center of the image to the peripheral part. Because of properties of the process target, a code can be detected more quickly with a shorter processing time when the block is selected from a position that has a higher possibility of containing the code.

The standard deviation (SD) of the gradient values of the pixels in the block is calculated (S12), and whether the calculated value exceeds a predetermined SDcode value is determined (S13). When the calculated value exceeds the number of edges in the horizontal direction (HEdge) is calculated (S14), the number of edges in the vertical direction (VEdge) is calculated (S15), and whether these values exceed a predetermined value EDGEmin is determined (S16).

When either or both the number of edges in the horizontal direction and the number of edges in the vertical direction exceed(s) the predetermined value, a black pixel ratio BPRatio is calculated (S17), the correlation HSoukan between horizontal lines is calculated (S18), the correlation VSoukan between vertical lines is calculated (S19), and whether or not the black pixel ratio is above a predetermined minimum value BPRATIOmin and below a predetermined maximum value BPRATIOmax is determined (S20).

When the determination conditions are satisfied, the block is determined to be a code area (S22) and it is then determined whether or not the code area is a one-dimensional code (S23). The determination of the one-dimensional code will be explained in more detail with FIG. 9.

When the determination condition for the black pixel ratio is not satisfied, whether or not the correlation between horizontal lines or the correlation between vertical lines exceeds a predetermined minimum value SOUKANmin is determined (S21). When either of the correlations between lines exceeds the predetermined minimum value, the processes in and after Step S22 are performed.

When the code area is determined to be a one-dimensional code, whether or not the one-dimensional code is in a rotated state is determined (S24). Details of the determination process will be described later. When the presence of rotation is determined, a decoding process is performed under the assumption that the one-dimensional code is rotated (S25) and the process is terminated. When the absence of rotation (horizontal state) is determined, the decoding process is performed assuming that the one-dimensional code is in the normal state, that is, in the horizontal direction (S26), and the process is terminated.

When the code area is not determined to be a one-dimensional code, whether or not the area is a two-dimensional code is determined (S27). When it is a two-dimensional code, a decoding process for a two-dimensional code is performed (S28), and the process is terminated.

When the standard deviation is the predetermined value or less in step S13, both the number of edges in the horizontal direction and the number of edges in the vertical direction are equal to or less than the predetermined minimum value in step S16, one or both of the correlation between horizontal lines and the correlation between vertical lines is equal to or less than the predetermined minimum value in step S21, and the code area is not determined to be a two-dimensional code in step S27, a return to step S11 is conducted and the processes in and after step S12 are repeated, selecting the next block. It is essentially impossible for the code area to be determined to not be a two-dimensional code in step S27. However, if this occurs, the processes in and after step S11 are repeated, assuming a certain error. When the absence of a code is determined in step S24, the processes in and after Step 11 are repeated, also assuming an error.

Figure 9:
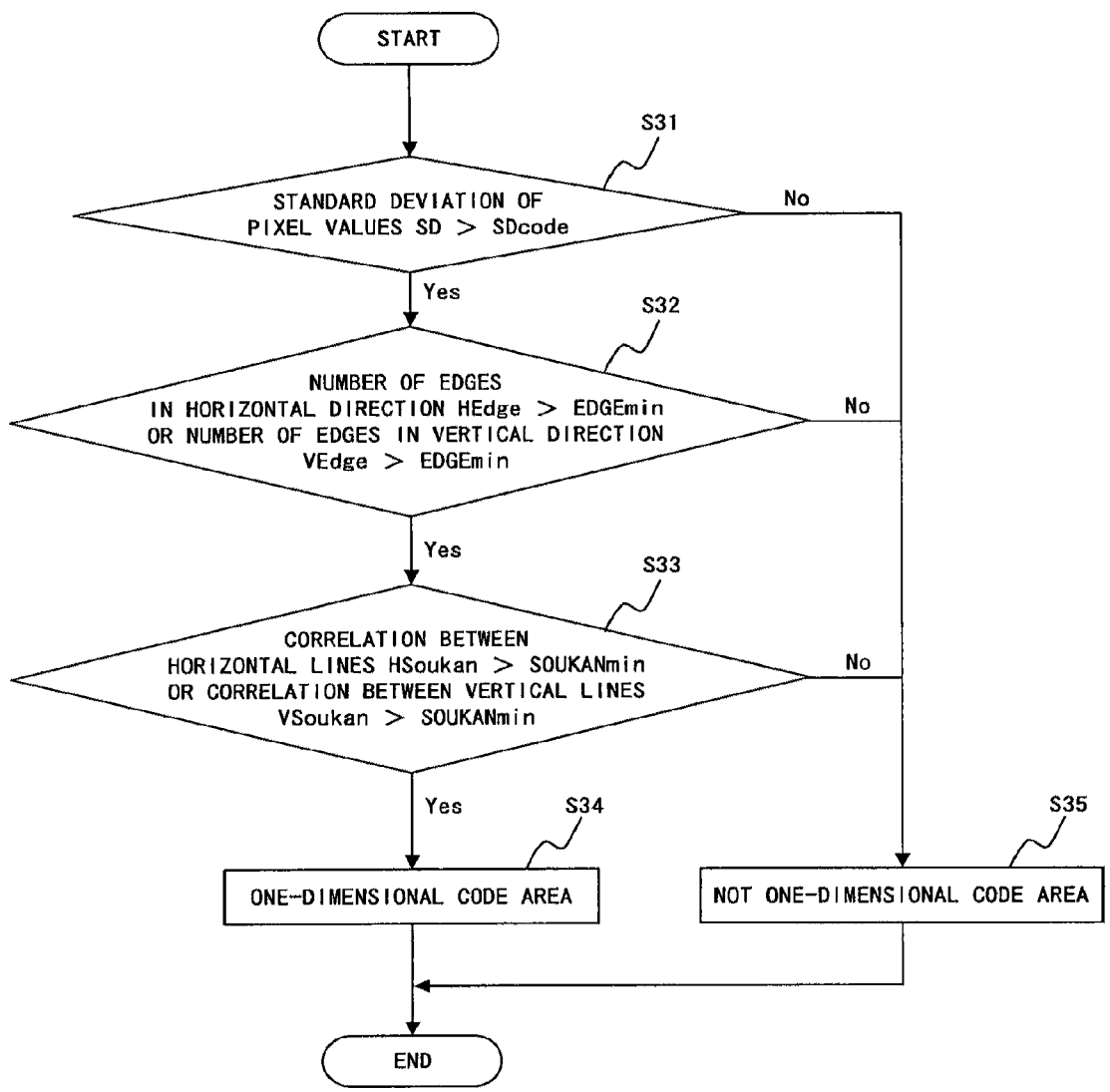
FIG. 9 is a detailed flowchart of a determination process of a one-dimensional code.

FIG. 9 is a detailed flowchart of the determination process of a one-dimensional code in step S23 in FIG. 8. With the start of the processes in FIG. 9, whether or not the standard deviation (SD) of the gradient values of the pixels exceeds a predetermined value is determined (S31). The predetermined value is assumed to be the same as the one in, for example, step S13 in FIG. 8. When the value exceeds the predetermined minimum value, whether or not one or both of the number of edges in the horizontal direction and the number of edges in the vertical direction exceeds a predetermined minimum value is determined (S32). The predetermined minimum value is also assumed to be the same as the one in step S16.

When either of the number of edges exceeds the predetermined minimum value, whether or not the correlation between horizontal lines or the correlation between vertical lines exceeds a predetermined minimum value (the same as in step S21) is determined (S33). When it exceeds the predetermined minimum value, the determination as a one-dimensional code area is made (S34) and the process is terminated, moving to the process in Step S24 in FIG. 8.

When the standard deviation in step S31, both the number of edges in the horizontal direction and the number of edges in the vertical direction in step S32, and both the correlation between horizontal lines and the correlation between vertical lines in step S33 are determined to be equal to or less than their respective corresponding predetermined values, the determination that it is not a one-dimensional code (S35) is made, and the process is terminated, moving to step S27 in FIG. 8.

Figure 10:
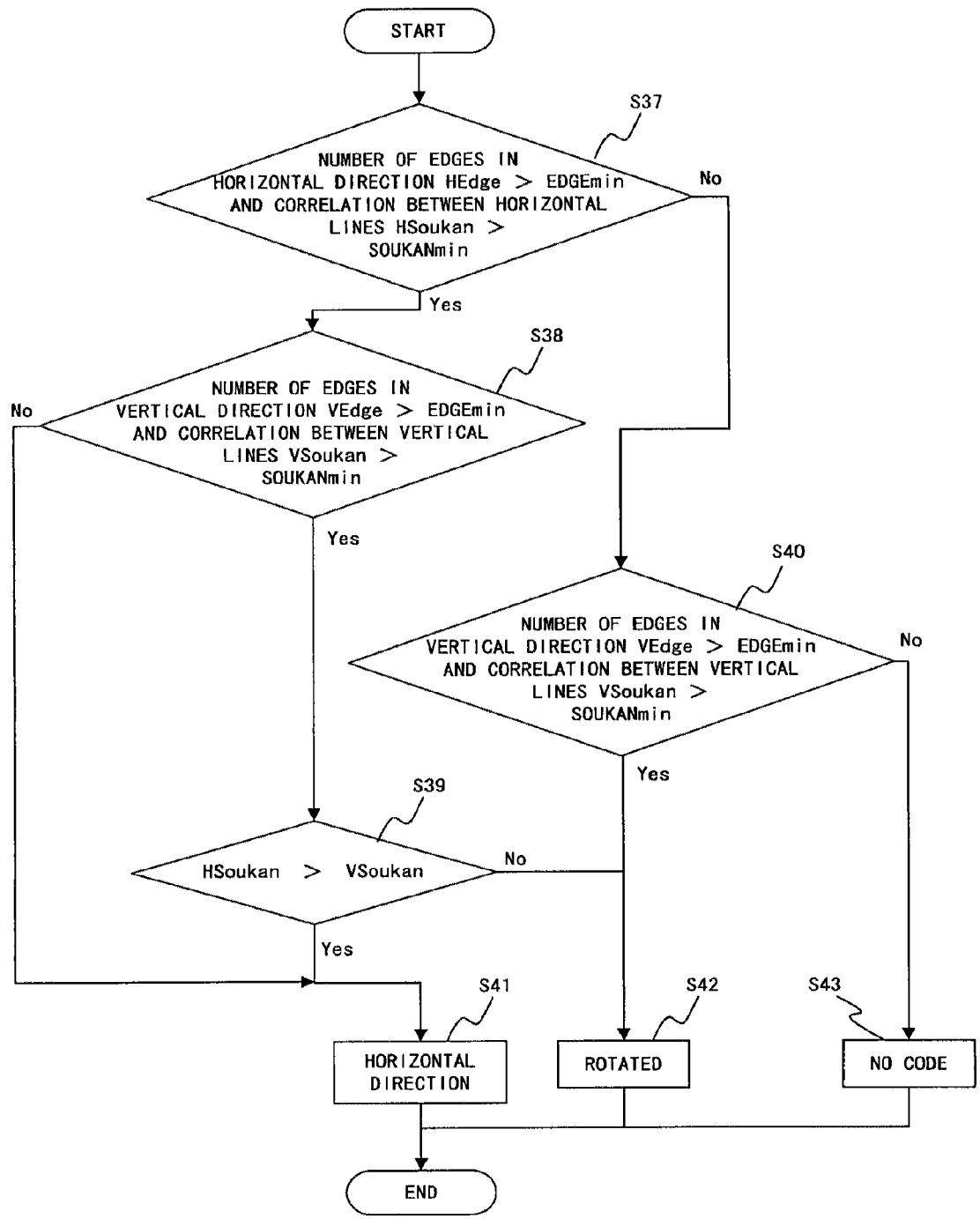
FIG. 10 is a detailed flowchart of a determination process of the presence/absence of rotation in a one-dimensional code.

FIG. 10 is a detailed flowchart of the determination process of the presence/absence of rotation in a one-dimensional code in step S24 in FIG. 8. With the start of the processes in FIG. 10, whether or not the number of edges in the horizontal direction exceeds a predetermined minimum value and the correlation between horizontal lines exceeds a predetermined minimum value is determined (S37). This determination is the condition for the one-dimensional code being in the horizontal direction, as depicted on the left in FIG. 7. When this condition is satisfied, whether or not the number of edges in the vertical direction exceeds a predetermined minimum value and the correlation between vertical lines exceeds a predetermined minimum value is determined (S38). This condition corresponds to the rotated state of the one-dimensional code on the right in FIG. 7. When the condition is not satisfied, the one-dimensional code is determined to be in the horizontal direction (S41), moving to the process in step S26 in FIG. 8.

When the determination condition in Step S38 is satisfied, it corresponds to the case where the one-dimensional code is neither in the horizontal direction nor rotated by 90 degrees, but is tilted, for example. In this case, whether or not the correlation HSoukan between horizontal lines exceeds the correlation VSoukan between vertical lines is determined (S39). When it does, the one-dimensional code is determined to be in the horizontal direction (S41), moving to the process in step S26 in FIG. 8.

When the determination condition is not satisfied in Step S37, whether or not the same determination condition as in Step S38 is satisfied is determined (S40). When it is satisfied, or when the correlation between horizontal lines is determined to be equal to or less than the correlation between vertical lines, the one-dimensional code is determined to be rotated (S42), moving to step S25 in FIG. 8. When the determination condition in not satisfied in Step S40, it is determined that there is an absence of a code (S43), and the processes in and after Step S11 are repeated assuming the occurrence of a certain error.

Figure 11:
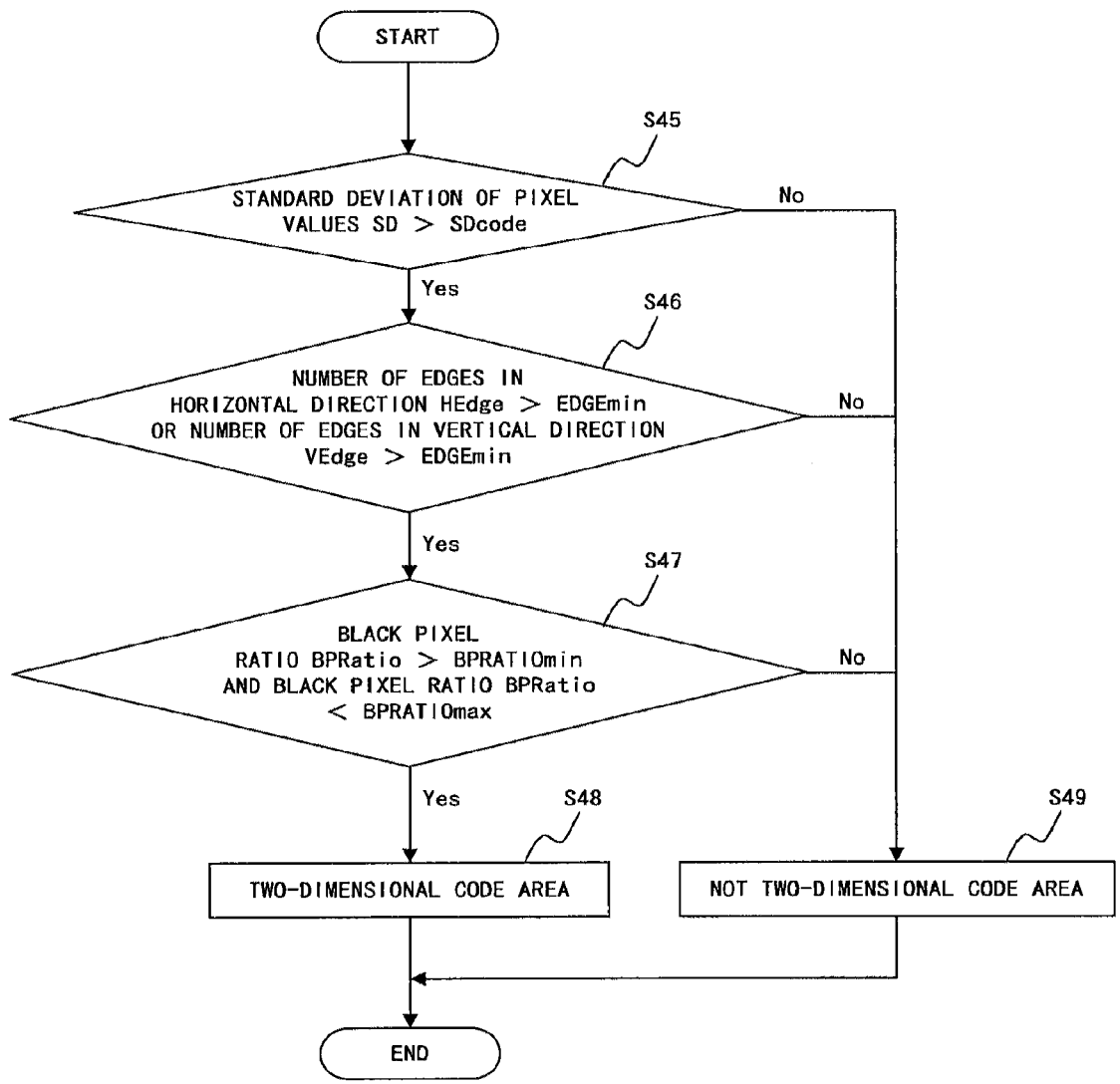
FIG. 11 is a detailed flowchart of a determination process of a two-dimensional code.

FIG. 11 is a detailed flowchart of the determination process of a two-dimensional code in Step S27 in FIG. 8. With the start of the processes in FIG. 11, whether or not the standard deviation of the gradient values of the pixels exceeds a predetermined value is determined (S45). When it exceeds the predetermined value, whether or not both the number of edges in the horizontal direction and the number of edges in the vertical direction exceed a predetermined minimum value is determined (S46). When it exceeds the predetermined value, whether or not the black pixel ratio is above a predetermined minimum value and is below a predetermined maximum value is determined (S47). When this condition is satisfied, it is determined to be a two-dimensional code (S48), moving to step S28 in FIG. 8. On the other hand, when the standard deviation in step S45 or at least either one of the number of edges in the horizontal direction or the number of edges in the vertical direction in step S46 is equal to or less than the respective predetermined value, or when the black pixel ratio is not between the predetermined minimum value and maximum value in step S47, the determination that it is not the two-dimensional code is made (S49) and the processes in and after Step S11 in FIG. 8 are repeated.

In the above flowchart, the same value is used for a one-dimensional code and a two-dimensional code as the minimum value of, for example, the number of edges in the horizontal direction and the number of edges in the vertical direction as described above. Meanwhile, the process can obviously be performed with a distinction between the values for the one-dimensional code and the two-dimensional code. In addition, the determination conditions of the one-dimensional code determination process, for example in FIG. 9, are included in Steps S13, S16, and S21 in FIG. 8, and the determination process of the presence/absence of rotation of the one-dimensional code in Step S24 can be conducted upon the satisfaction of the determination condition in step S21 under the assumption that the process target block is a one-dimensional code area.

FIG. 12 is a diagrammatic illustration of the code image processing method according to the first embodiment of the present invention. In FIG. 12, a two-dimensional code is searched using a progressive scan of the image data one small block area 300 at a time from the upper left corner in the transverse direction. When the small block area 300 enters a first two-dimensional code 100 and features of the image within the area at a position 310 in the first two-dimensional code 100 coincide with a two-dimensional code, the block area is specified as containing a code and a recognition process is performed in the area around it. When a two-dimensional code is successfully recognized, the area of the first two-dimensional code is further extracted (see FIG. 12(a)); this process will be described later. When the area of the first two-dimensional code 100 is successfully extracted, the scanning of one small block area 300 at a time is continued as shown in FIG. 12(b) to search for a second two-dimensional code 200. With an already recognized entrance to the area of the first two-dimensional code 100, the area is skipped to continue the search, which will also be described later. The second two-dimensional code 200 can be detected at a high speed by repeating the operation.

Thus, the block judgment process and code recognition process can be omitted in the skipped small block area, making it possible to perform the search process for all two-dimensional codes in image data at a high speed.

The outline of the two-dimensional code recognition process is described here. The two-dimensional code recognition process is performed in the following order: a code area extraction process, a resolution conversion process, and a decoding process. First, in the code area extraction process, the detection of coordinates within the code is performed, followed by the detection of the cell size, and the detection process of a code boundary is performed lastly. The resolution conversion process is for converting data of a cell into data of a pixel.

Figure 13:
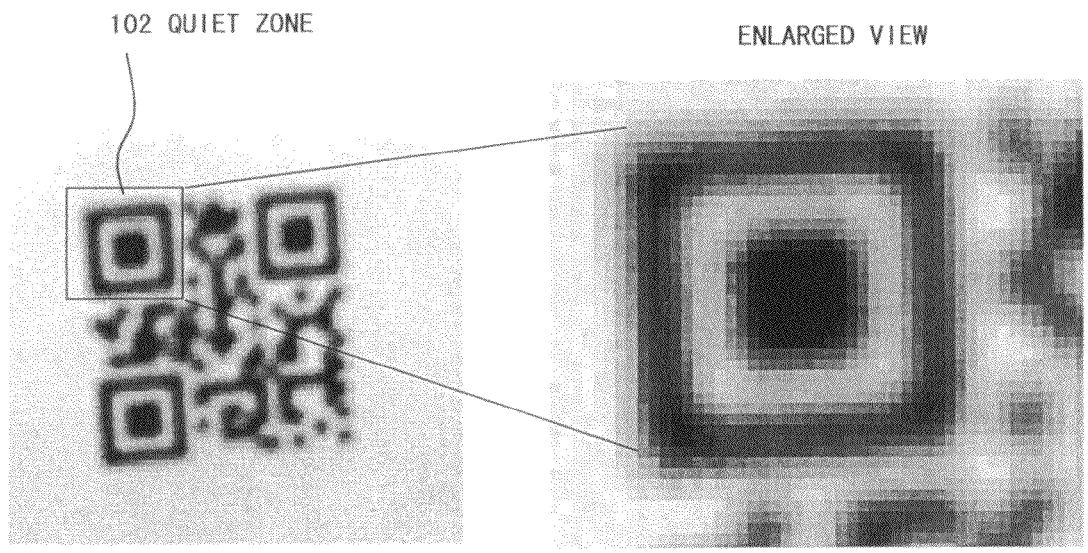
FIG. 13 is a diagram depicting the principle of a detection method for detecting a boundary of a two-dimensional code.

FIG. 13 is a diagram depicting the principle of a detection method of a boundary of a two-dimensional code. There are cases in which positioning symbols of a QR code cannot be accurately detected, such as when an optical distortion or defocus occurs in obtaining image data. According to this embodiment, however, the boundary of a two-dimensional code can be detected by detecting a white area located around the code, that is, a quiet zone 102. For example, around a QR code, there are white areas (quiet zones) (there is a related description in FIG. 28) five cells in size. Since the quiet zones are not affected much by the optical distortion or defocus, the boundary of the two-dimensional code can be detected with a high accuracy.

In FIG. 12, the small block area 300 enters the first two-dimensional code 100 during the scan and checks the features of the image in the area at the position 310 in the first two-dimensional code 100. First, the continuous lengths of the white area and black area are detected in the directions of left, right, up and down from the position 310 in the two-dimensional code. A distribution is obtained using the frequency of occurrence of each length that is detected, and the cell size is obtained as the minimum continuous length within the range where the frequency of occurrence is equal to or more than a certain value, which will be described using FIG. 14.

FIG. 14 is a diagram depicting the cell size detection method. In FIG. 14, the continuous lengths of the white area and black area are detected in the directions of left, right, up and down from a given point in a two-dimensional code. A distribution is obtained using the frequency of occurrence of the lengths, and the cell size is obtained as the minimum continuous length within the range where the frequency of occurrence is equal to or more than a certain value. A continuous length with a small frequency of occurrence value is neglected, since an irrelevant continuous length is sometimes detected in an image due to the influence of defocusing, noise, etc., and the cell size is obtained as the minimum continuous length within the range with a frequency of occurrence value equal to or more than a certain value. The cell sizes of the white cells and black cells in a two-dimensional code are assumed to be the same.

Figure 15:
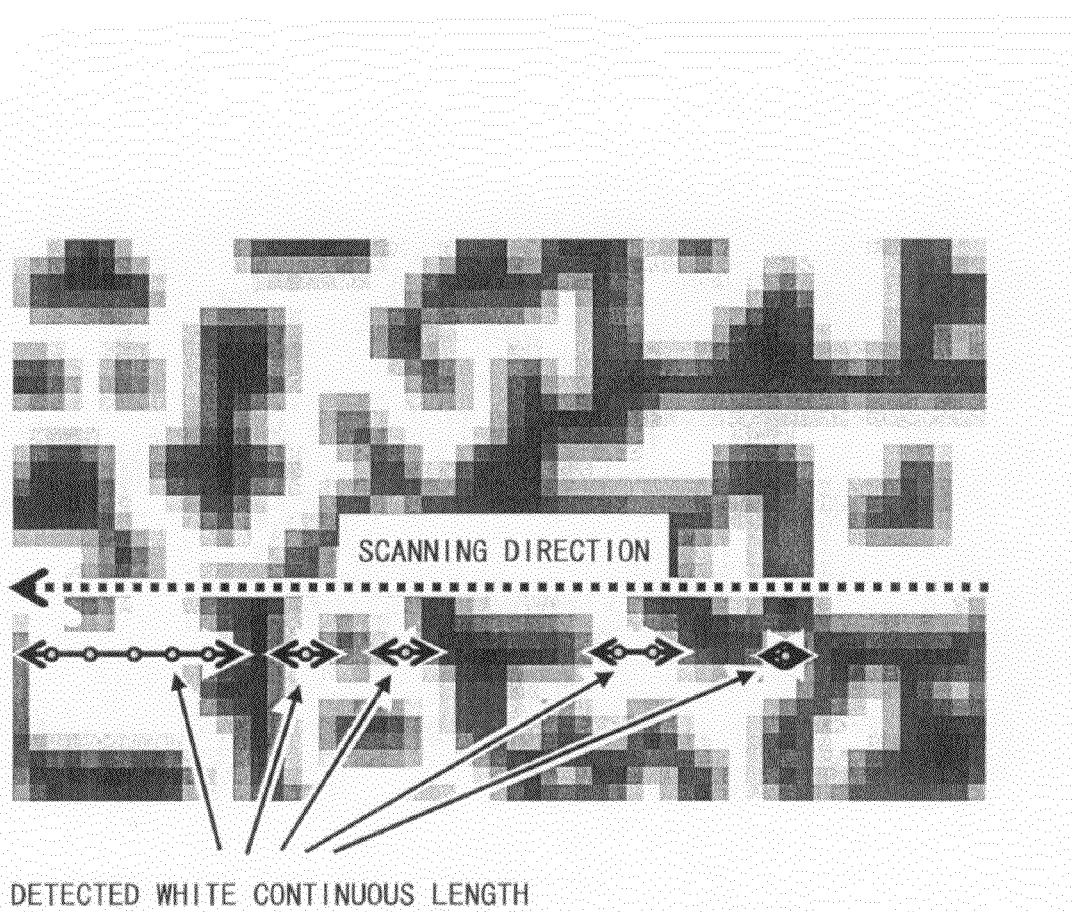
FIG. 15 is a diagram depicting a detection method for detecting a first white continuous length.

FIG. 15 is a diagram depicting a detection method of a first white continuous length. In FIG. 15, the white continuous lengths of continuous white cells are detected by a scan in any one of the directions of left, right, up or down from a given point in a two-dimensional code. In FIG. 15, the scan is conducted to the left, and a length of five cells in size is detected as the first white continuous length.

Figure 16:
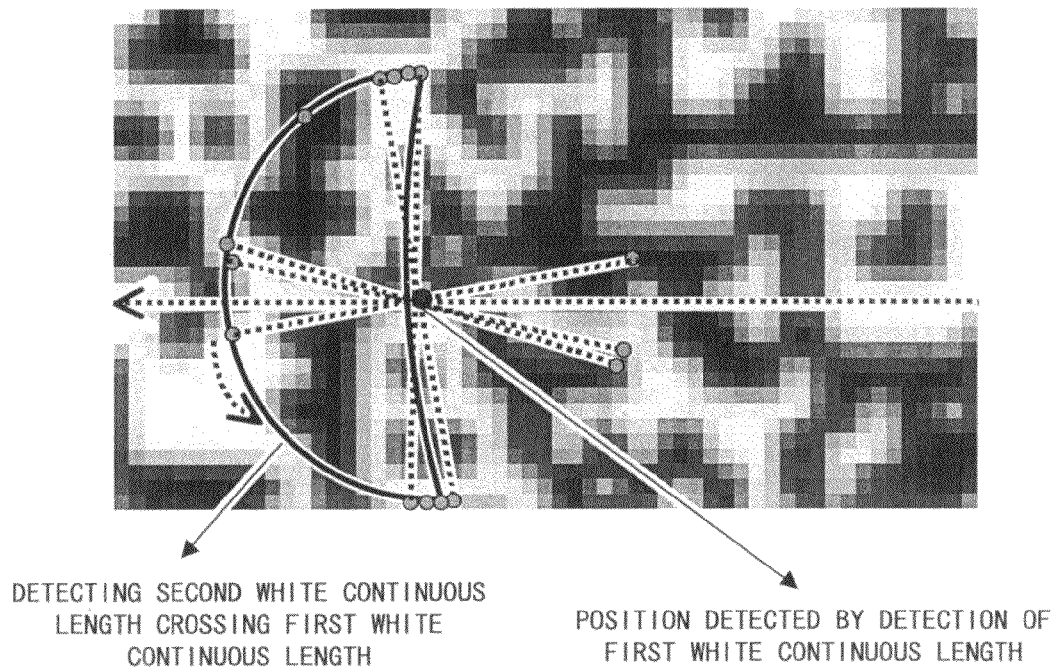
FIG. 16 is a diagram depicting a detection method for detecting a second white continuous length.

FIG. 16 is a diagram depicting a detection method of a second white continuous length. The detection of the second white continuous length is conducted in the direction crossing the first continuous length detected in FIG. 15. A circle having a predetermined diameter is drawn with a point on the first white continuous length as the center. When the points on a line between a point on the circumference of the circle and a point symmetric to the point with respect to the center are all white, the line is detected as a part of the second white continuous length.

When such a second white continuous length is not detected corresponding to each point on the circumference having a predetermined diameter with a point on the first white continuous length as the center, the point to be the center of the circle is shifted on the line of the first white continuous length. The detection process of the second white continuous length is repeated corresponding to points on the circumference having a predetermined diameter with the point as the center. The process is repeated, for example, to the leftmost position of the image containing the two-dimensional code.

Figure 17:
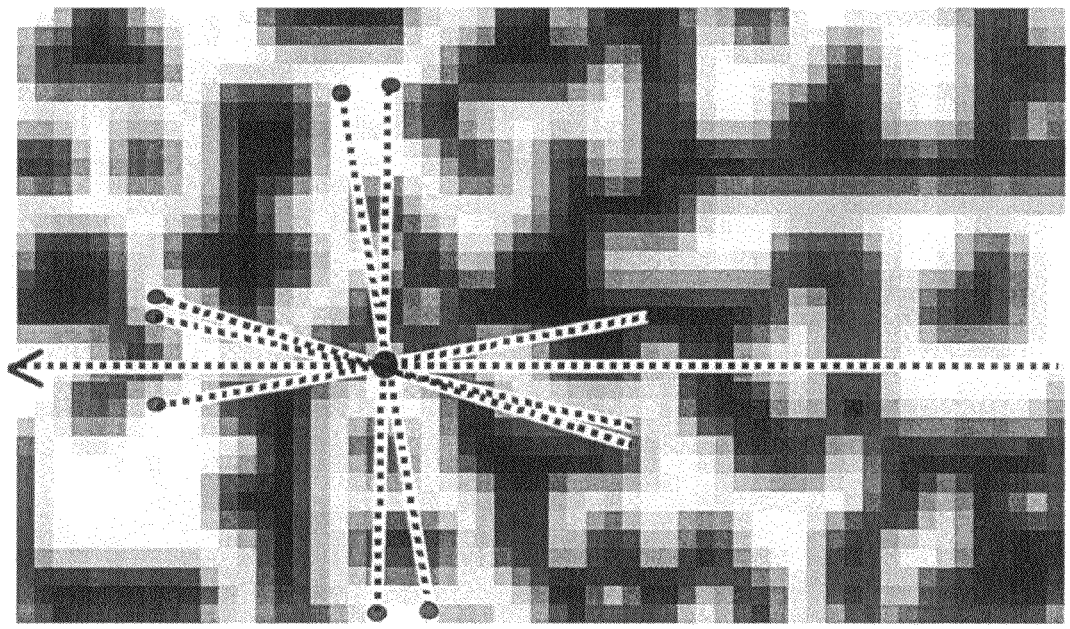
FIG. 17 is a diagram depicting a detection operation of the second white continuous length within a code.

FIG. 17 and FIG. 18 are diagrams depicting a detection method of the code boundary as the second white continuous length. FIG. 17 is a diagram depicting a detection operation of the second white continuous length directed to the points on a predetermined circumference with a point on the first white continuous length in a code as the center. When the diameter of the circle for detecting the second white continuous length is expanded more than a certain degree, such a long white continuous length cannot be detected within a code.

FIG. 18 is a diagram depicting a detection operation of the second white continuous length on a code boundary. Since the code boundary has quiet zones as described above, a white continuous length longer than the diameter of the circle for detecting the second white continuous length can be detected. Actually, as will be described later, when a white continuous length that is the same length as the diameter of the circle is detected, the line is extended further in both directions, and whether or not the points on the extended line are all white is detected. When they are all white, the line is detected as a second white continuous length of a quiet zone in the two-dimensional code.

Figure 19:
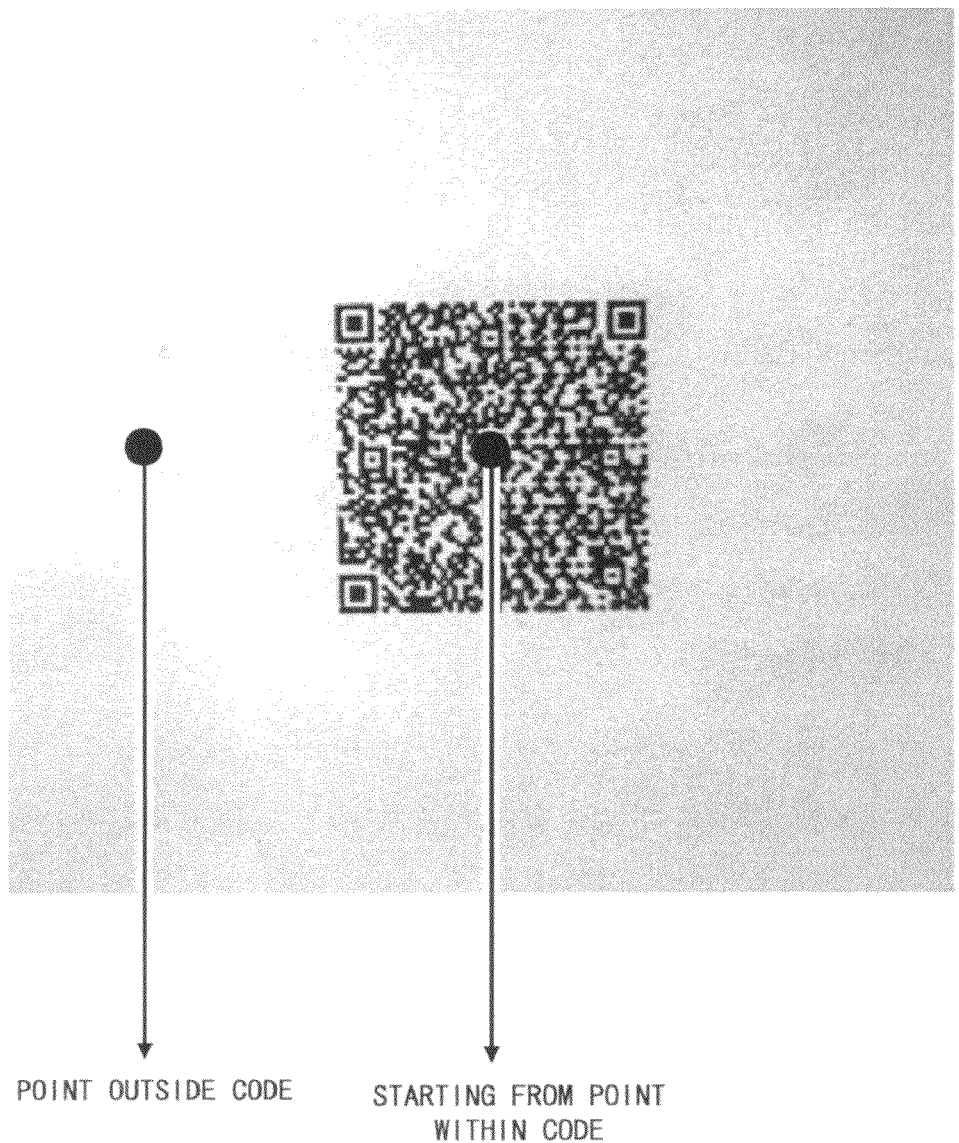
FIG. 19 is a diagram depicting a starting point of a code boundary detection process.

FIG. 19 is a diagram depicting a starting point of the code boundary detection process. The detection process of the first white continuous length starts with a given point within a code as the starting point. If a point outside the code were the starting point, the boundary detection process would be conducted in an area other than the two-dimensional code, such as an area containing figures and characters. The position of the starting point is specified corresponding to blocks specified as a two-dimensional code.

Figure 20:
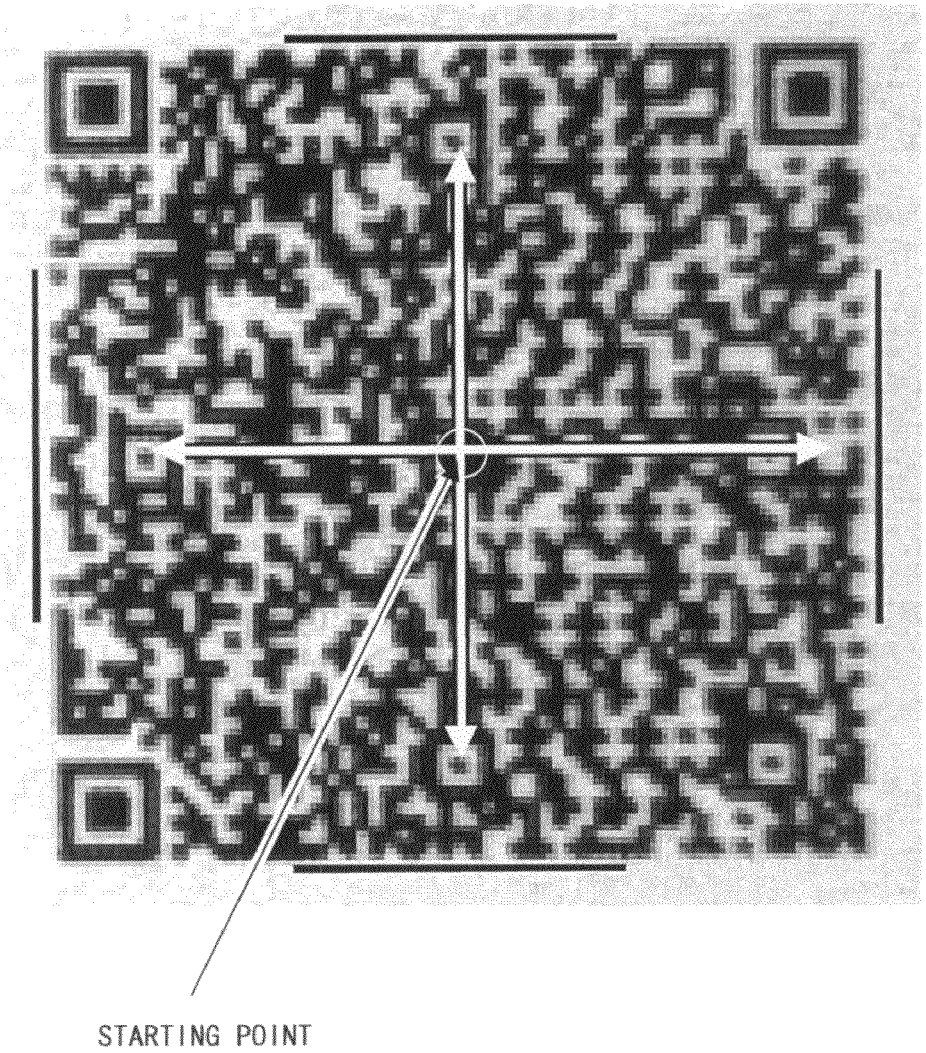
FIG. 20 is a diagram depicting the code boundary detection in the four directions of left, right, up and down.

FIG. 20 is a diagram depicting the code boundary detection in the four directions of left, right, up and down. The image is scanned in the directions of left, right, up and down from the starting point of the boundary detection process as described above, and the boundaries in the four directions corresponding to the quiet zones of the two-dimensional code are detected by detecting the first white continuous length and the second white continuous length.

When the boundaries on the left side, right side, top and bottom are thus detected, the degree of tilt in the image of the two-dimensional code can also be obtained. As an example of a simple method of doing this, the degree of the tilt of the code can be obtained from the tilt of the boundaries assumed as straight lines. As a more precise method, the positions of the positioning symbols can be detected using the detection result of the boundaries, and the degree of tilt of the two-dimensional code can be calculated from their positions.

Figure 21:
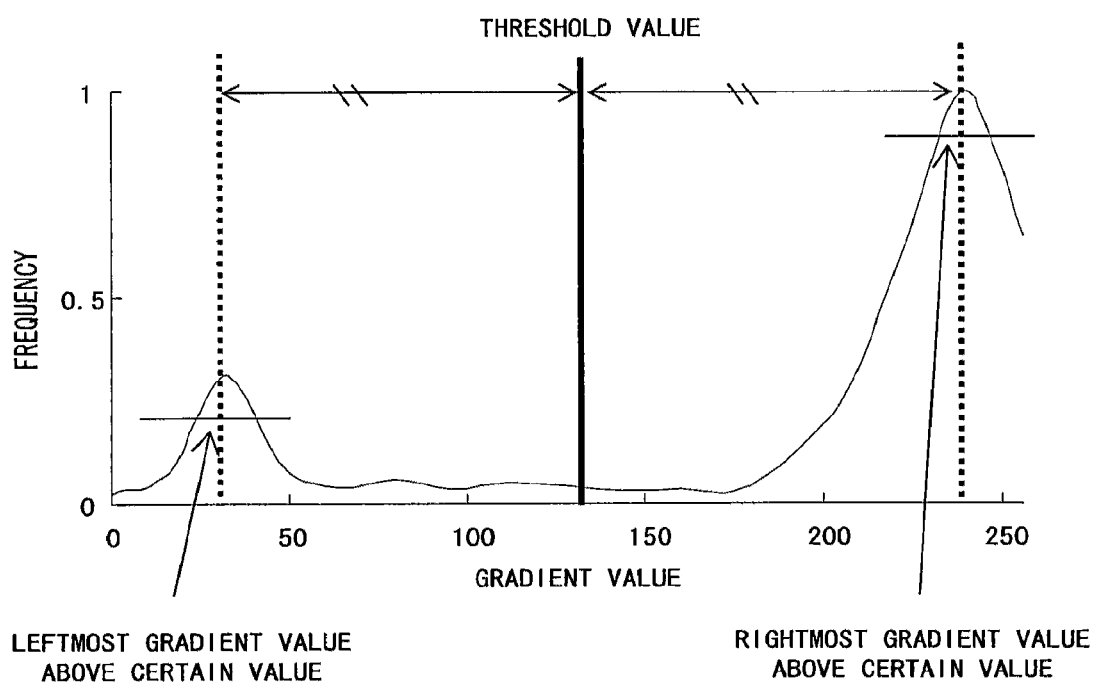
FIG. 21 is a diagram depicting a threshold value determination method.

FIG. 21 is a diagram depicting a threshold value determination method for separating white cells and black cells. When illumination on a two-dimensional code is low or when a sensor has a low sensitivity, sometimes it cannot be accurately determined whether a cell is black or white when the threshold value is fixed as, for example, 128, which is the midpoint of 256 gradient values. For example, the illumination level is low, the entire range of the gradient values is reduced to a low level, generating fading and crushing. The threshold determination method shown in FIG. 21 is used in order to eliminate the influence of the fading and crushing.

A two-dimensional code is generally expressed in the binary of black and white, and the histogram of the gradient values of each cell in an input image shows two peaks in the bright area and dark area as shown in FIG. 21. By determining the threshold value as the midpoint (average value) between the peak in the leftmost of the gradient values and the peak in the rightmost of the gradient values, each peak having a frequency of occurrence exceeding a certain value, the determination of white cells and black cells can be performed with a high accuracy, eliminating the influence of fading and crushing.

Instead of using a threshold as described above, the determination of black cells and white cells can be performed using the method comparing the gradient value of a cell of interest with the gradient value of a neighboring cell, and when the difference exceeds a predetermined value, determining the cell with the larger gradient value to be a white cell and the cell with the smaller gradient value to be a black cell.

Figure 22:
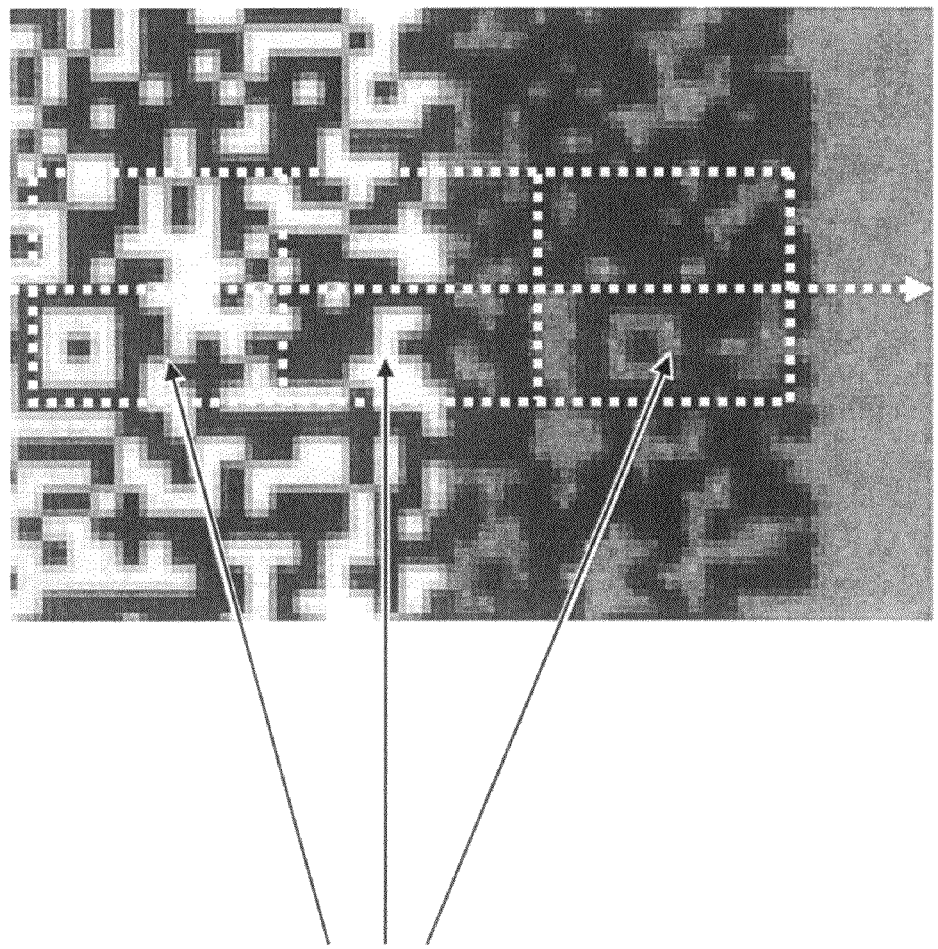
FIG. 22 is a diagram depicting a threshold value determination method within certain areas.

FIG. 22 is a diagram depicting a threshold value determination method within certain areas. When a fixed threshold value to determine black cells and white cells is used for the entire image of a two-dimensional code, the determination sometimes cannot be accurately preformed due to the size of the image area of the two-dimensional code or the influence of shadows generated by the illumination direction. When there is a part of the code with a dark shadow on it and another part of the code with little or no shadow on it, the determination of black cells and white cells needs to be performed with different threshold values for the part with a dark shadow on it and the part with little or no shadow.

For example, when an image is scanned rightward in FIG. 22, the first white continuation value and the second white continuation value are detected while modifying the threshold value, for example at intervals of a predetermined distance. The scan distance at which the modification of the threshold value is conducted can be appropriately determined by repeated experiments changing the position of the light source and its intensity.

Figure 24:
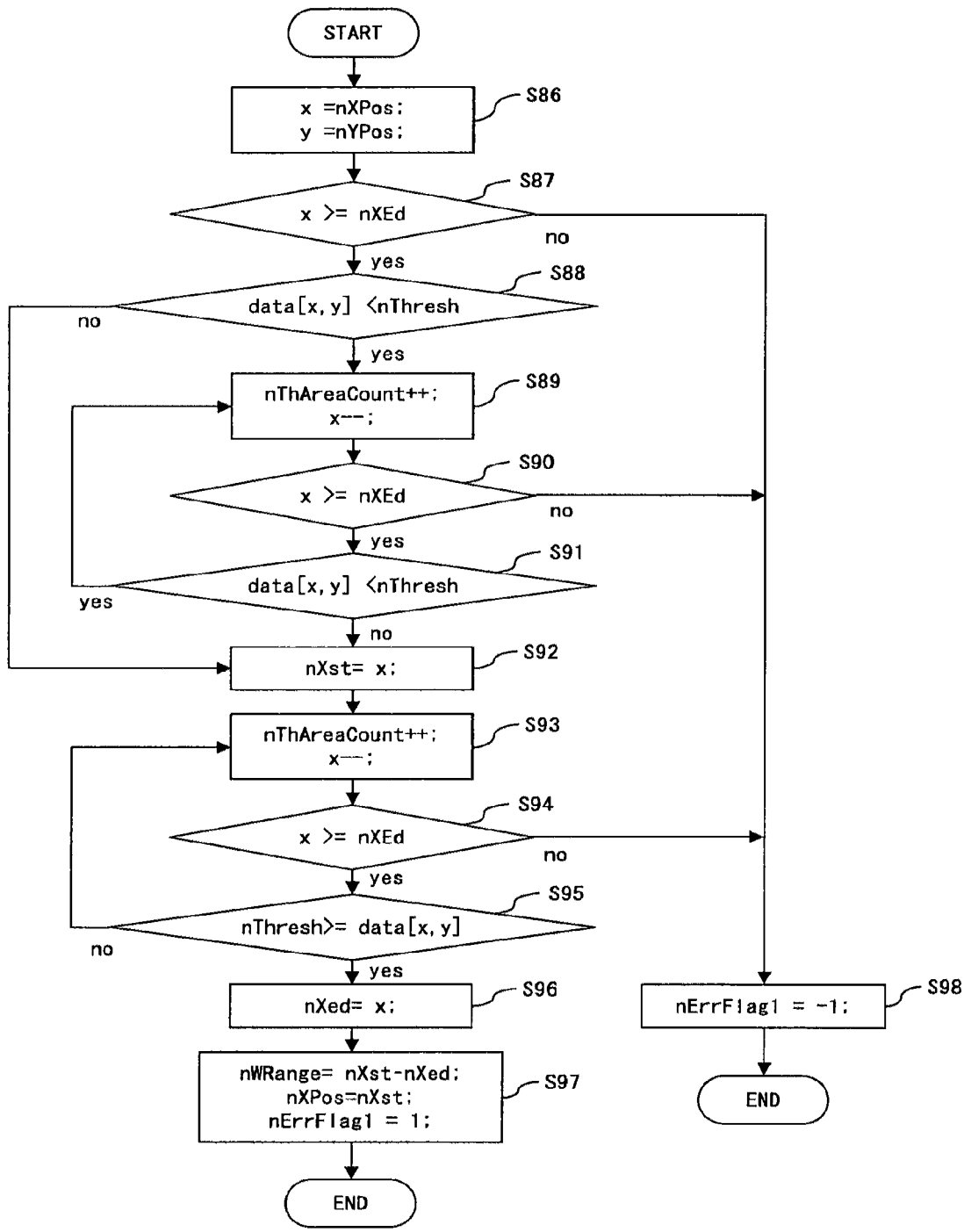
FIG. 24 is a detailed flowchart of a detection process of the first white continuous length.
Figure 25:
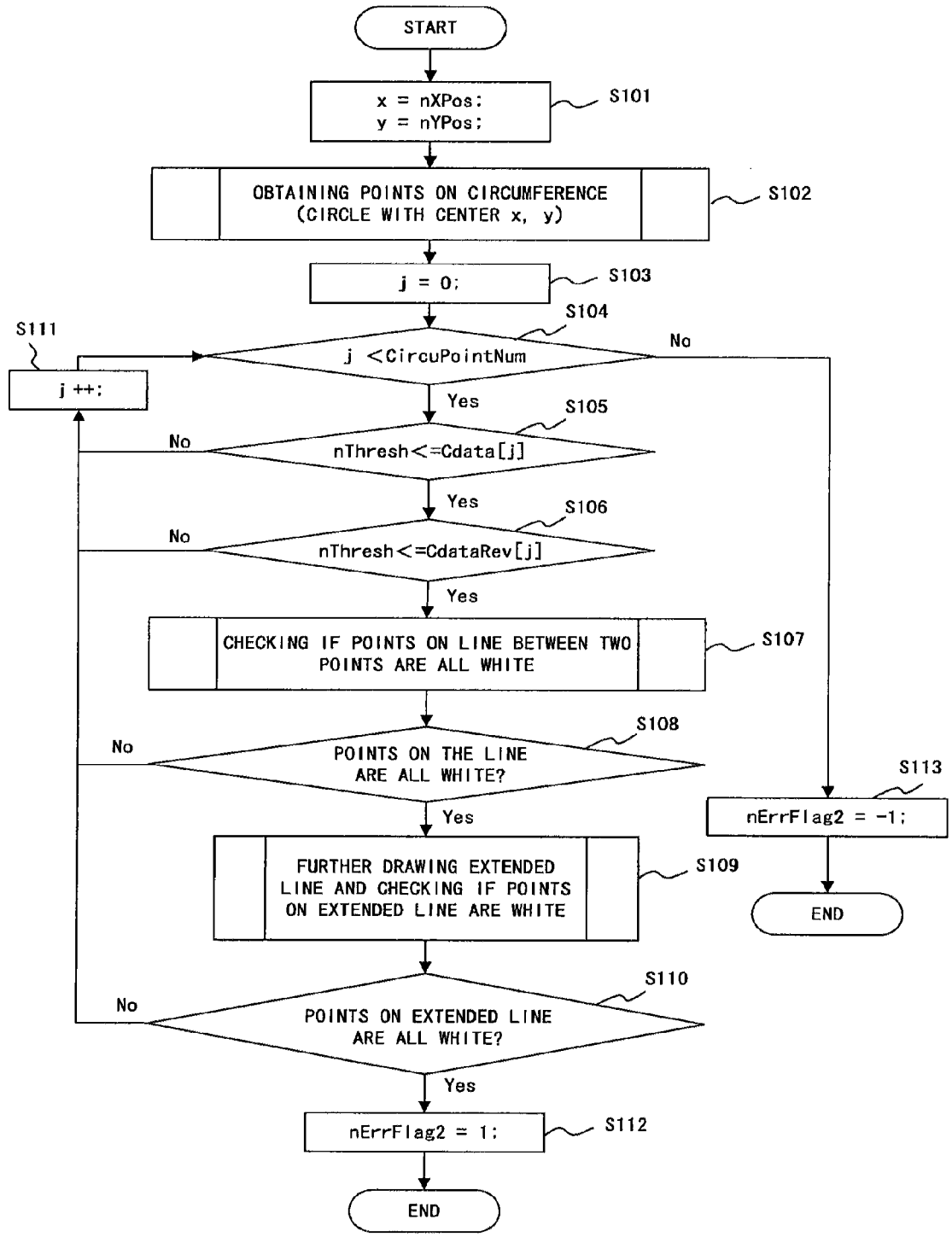
FIG. 25 is a detailed flowchart of a detection process of the second white continuous length.

The detection method of a boundary of a two-dimensional code outlined above is described in further detail using the flowcharts in FIG. 23 to FIG. 25. FIG. 23 is an overall flowchart of the code boundary detection process. The two-dimensional code to be the detection target here is assumed to be, for example, a QR code as described above; however, the process can be performed for other two-dimensional codes.

With the start of the processes in FIG. 23, the counter of the threshold value area corresponding to the distance at which the threshold value is updated is initialized to zero in step S71. Coordinates r_nx_ct and r_ny_ct of the scan starting point in the code, that is, the coordinates of the point in the two-dimensional code area detected in the above description, are assigned to coordinates nXPos and nYPos of the current process target point, and whether or not the X-coordinate nXPos of the current point is equal to or more than the X-coordinate nXEd (=0) of the leftmost point of the image is determined in step S72. Meanwhile, the process flowchart is explained assuming that the image is scanned leftward from the starting point, as described in FIG. 20.

When it is determined in step S72 that the current point has not reached the leftmost point of the image, whether or not the value of the counter of the threshold value area exceeds the value nThArea that requires the updating of the threshold is determined in step S73. When it exceeds this value, the detection process of the threshold is performed in Step s74 to update the threshold value nThresh. The detection process of the threshold is performed using the method described in FIG. 21.

Following the process in step S74 and after, the value of the counter of the threshold value area is initialized to zero in step S75, or when the value of the counter does not exceed the value that requires the updating of the threshold in step S73, a move to the first white continuous length detection in step S76 is conducted. The process will be described in detail using FIG. 24. For the detection process, nWRAnge indicating the first white continuous length, the value of the counter of the threshold value area, the coordinate values of the current point, and the value of a variable of the threshold value nThresh are carried over. In these values, all of the values except for the Y-coordinate nYPos of the current point and the threshold value nThresh are updated in the detection process of the first white continuous length. There is also a possibility that the value of the counter of the threshold value area will exceed the value of nThArea during the detection process of the first continuous length. However, it is assumed here that the first white continuous length is relatively short and that the threshold value is not updated during the process.

With the completion of the detection process of the first white continuous length, whether or not an error has occurred because a white continuous length was not detected in the detection process of the first white continuous length is determined in step S77. When it is determined that there is an error, the process is terminated. When the first white continuous length is successfully detected, a counted value nWCount used in the completion determination process of the detection of the second white continuous length is initialized to zero in step S78. Whether or not the counted value is less than nWRange indicating the second white continuous length is determined in step S79, and when it is less, the detection of the second white continuous length is conducted in Step S80. The process will be described in detail using FIG. 25. The X-coordinate and Y-coordinate of the current point and the threshold value are carried over for this process.

Next, whether or not the second white continuous length has been successfully detected is determined in step S81. When it has been successful, the process is terminated. When it has not been successful, nWCount and the value of the counter of the threshold value area are incremented and the X-coordinate of the current point is decremented in step S82, followed by the repetition of the processes in and after step S79.

That is, as described using FIG. 15 and FIG. 16, the process of detecting the second white continuous length is repeated while shifting the current point leftward on the line corresponding to the first white continuous length. The repetition of the process is completed when the value of nWCount reaches the first white continuous length, namely nWRange, and the processes in and after step S72 are continued again.

FIG. 24 is a detailed flowchart of a detection process of the first white continuous length. With the start of the processes in FIG. 24, the X-coordinate and Y-coordinate of the current point are assigned to variables x and y in step S86. Whether or not x has not reached the leftmost point of the image data is determined in step S87. If it has not reached the leftmost point, whether or not the data of the gradient value of the point having coordinates x, y is less than a threshold value is determined in step S88. Since the gradient value of a bright cell, namely a white cell, is larger than the gradient value of a black cell, a gradient value less than the threshold value indicates that the current process target cell is black, and the following processes in steps S89 to S91 are repeated until a white cell is found.

In step S89, the counter of the threshold value area is incremented, coordinate x of the process target cell is decremented, and whether or not it has not reached the leftmost point of the image is determined in step S90 in the same way as in S87. When it has not reached the leftmost point, whether or not the gradient value is less than a threshold value is determined in step S91, in the same manner as in S88. When it is less than the threshold value, the processes in and after step S89 are repeated.

When the gradient value is larger than the threshold value in step S91, or when the gradient value is larger than the threshold value in step S88, the coordinate x of the cell is assigned to nXst indicating the X-coordinate of the starting point of the first white continuous length, moving to step S93.

After the value of the counter of the threshold value area is incremented and the X-coordinate x of the cell being processed is decremented in steps S93 to S95, whether or not the cell being processed has reached the leftmost point of the image and whether the cell is white are determined. When these determinations are both positive, the processes are repeated. When the gradient value of the cell is equal to or less than the threshold value and the cell is determined to be black in step S95, the X-coordinate x of the cell is assigned to nXed indicating the X-coordinate of the end point of the first white continuous length in step S96, and nWRange indicating the first white continuous length is obtained in step S97. In the entire process in FIG. 23, the value of nXPos indicating the X-coordinate of the cell being processed is set as the value of coordinate nXst of the starting point of the first white continuous length, and the value of a flag nErrFlag1 indicating the success of the detection of the first white continuous length is set to 1 to complete the process and carry out a return.

When it is determined in either step S87, step S90, or step S94 that x indicating the X-coordinate of the cell being processed has reached the leftmost point nXEd of the image data, the flag indicating the success of the detection of the first white continuous length is set as −1, that is, the value indicating a failure, followed by the completion of the process and the carrying out of a return.

FIG. 25 is a detailed flowchart of the detection process of the second white continuous length in Step S80 in FIG. 23. With the start of the processes in FIG. 25, the coordinates x and y of the process target cell are set in step S101 in the same way as in step S86 in FIG. 24. A circle with a point determined by the coordinates as the center is drawn in step S102, and points on its circumference are obtained. The circle is for detecting the second white continuous length as described above, and a circle with a relatively large diameter is used so as not to detect the second white continuous length within the code.

Next, j, the index of the point on the circumference, is initialized to zero in step S103, and whether or not the value of j is less than the number Circu Point Num of the points obtained in step S102 is determined in step S104. When it is less, whether or not the value of the gradient value Cdata[j] of the point indicated by the index j is equal to or greater than a threshold value is determined in step S105. When it is equal to or greater than the threshold value representing white, whether or not the gradient value CdataRev[j] of the point symmetric to the point indicated by the index[j] on the circumference with respect to the center of the circle is equal to or greater than a threshold value is determined in step S106. When it is equal to or greater than the threshold value, the colors of all the points on the line between the two points are checked in step S107, and whether or not they are all white is determined in step S108. When they are all white, an extended line is further drawn outward from this line, and whether or not the points on the extended line are all white is checked. Whether or not they are all white is determined in Step S110, and when they are all white, the value of a flag nErrFlag2 indicating the success of the detection of the second white continuous length is set to 1, followed by the completion of the process and the carrying out of a return. Meanwhile, the length of the extended line drawn in step S109 is determined so that the length of the entire line including the extended line becomes twice the diameter of the circle.

When the gradient value of the point indicated by the index j on the circumference in step S105 or the point symmetric to that point with regard to the center of the circle in step S106 is less than the threshold value, or when the points on the line or some of the points on the extended line in step S110 or step S108 are not white, the value of j is incremented in step S111 and the processes in and after step S104 are repeated. That is, the detection process of the second white continuous length is continued while shifting the point on the circumference detected in step S102. When it is determined that the process has been completed for all the points on the circumference in step S104, the detection of the second white continuous length is determined as having failed, and the value of the flag is set to −1 in step S113, followed by the completion of the process and the carrying out of a return.

Figure 26:
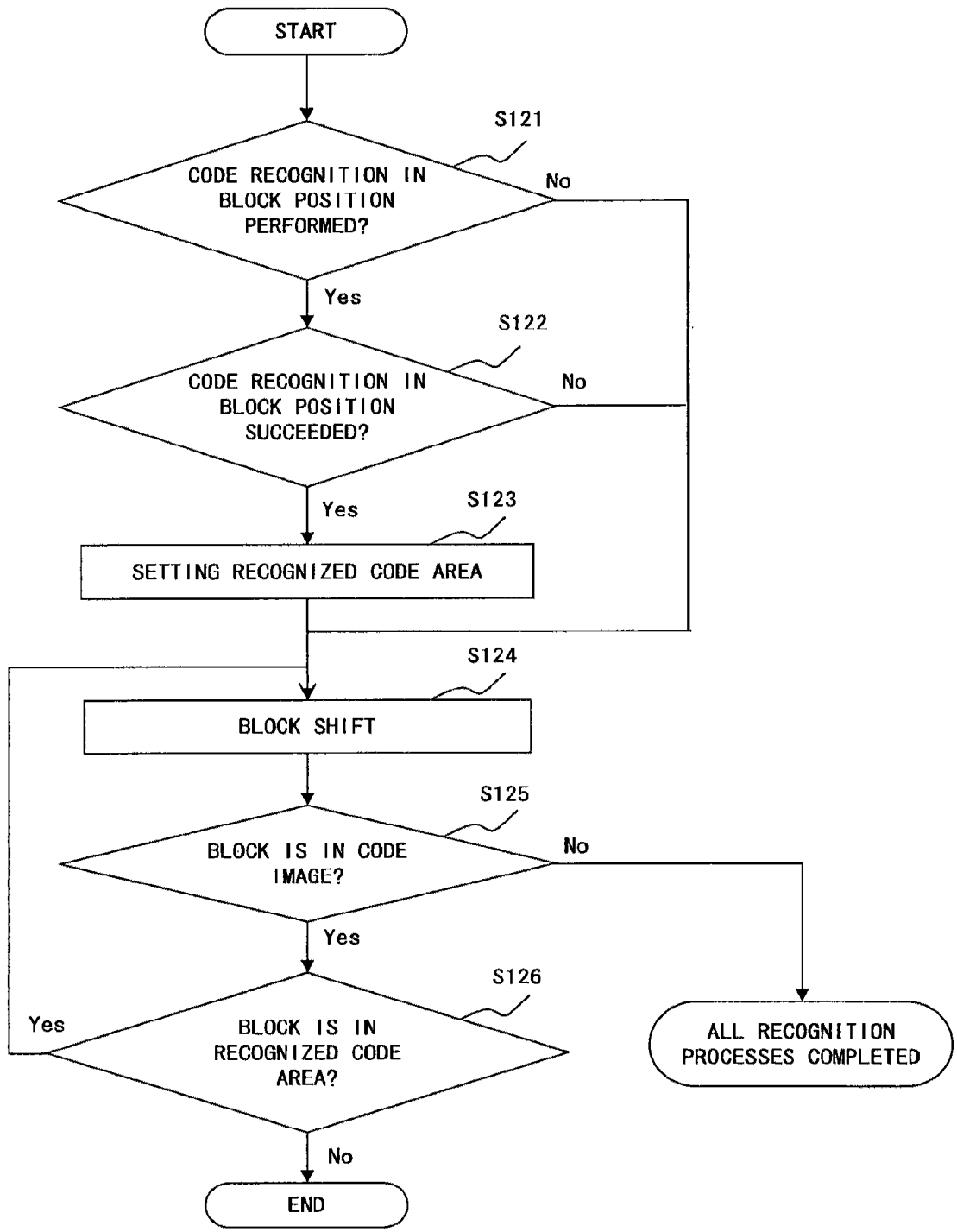
FIG. 26 is a flowchart depicting processes in the block scan control process shown in FIG. 3.

FIG. 26 is a flowchart depicting processes in the block scan control process 5 shown in FIG. 3. In the block scan control process in FIG. 26, whether or not a code recognition has been performed in a target block is determined first (S121). When the code recognition has not been performed, a shift to the next block is conducted (S124). When the code recognition has been performed and the recognition has been successful (S122), setting of the recognized code area is conducted (S123). When the recognition has failed (S122), a shift to the next block is conducted (S124). When, after a shift is conducted, the block that is scanned projects out of the image data (S125), it is assumed that the search has been completed in the entire area of the target image data and the process is thus completed. When the next block is within the set recognized code area (S126), the process is continued further, shifting to the next block (S124). The process time for the code search can be reduced by performing the process while skipping the recognized code area as described above.

[Second Embodiment]

Figure 27:
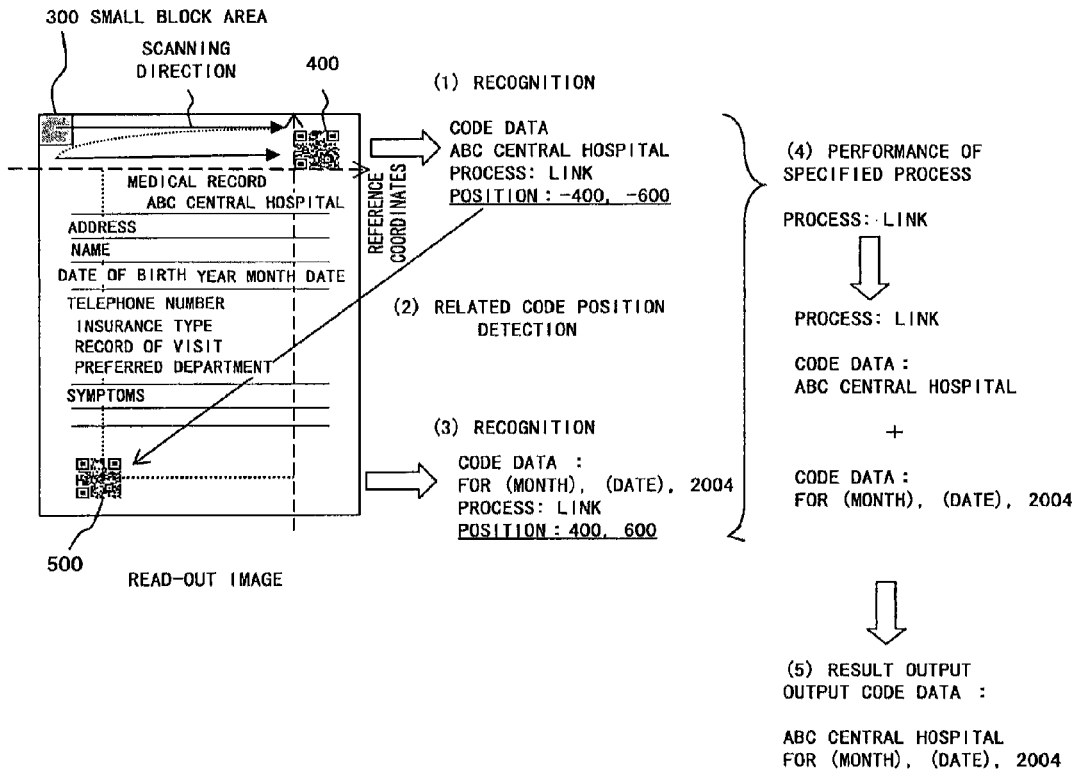
FIG. 27 is a diagrammatic illustration of a code image processing method according to a second embodiment of the present invention.

FIG. 27 is a diagrammatic illustration of a code image processing method according to the second embodiment of the present invention. This embodiment describes an example in which a plurality of (for example two) two-dimensional codes are placed in image data. The plurality of two-dimensional codes, for example a first two-dimensional code 400 and a second two-dimensional code 500, respectively store, outside the code data, the process methods for each other (for example, how to "link" the two-dimensional codes with each other) and relative position information as relation information.

In the readout image in FIG. 27, (1) the readout image data is scanned using a small block area in the transverse direction from the upper left corner of the image data to search for a two-dimensional code, and when the small block data enters the first code 400 on the upper right corner of the image data during the scan, it is determined that there is a two-dimensional code, and recognition of the first two-dimensional code 400 is performed. On the basis of the recognition result of the first two-dimensional code 400, information ("ABC central hospital" in this example) is obtained as code data from the first two-dimensional code 400. (2) Next, position information of a related code is detected and position information, "–400, –600" in this example, is obtained from the first two-dimensional code 400 as the code data. (3) On the basis of the position information, code recognition of the second two-dimensional code 500 is performed. In this example, "for (Month), (Date), 2004" is obtained as code data from the second two-dimensional code 500. (4) Here, since the relation information of the first two-dimensional code 400 shows "link" as the specified process and gives instructions on the manner of the link, the code data of the second two-dimensional code 500 is "linked" and processed in the order in which the data are read out. (5) As a result, for example, "ABC central hospital, for (Month), (Date), 2004" is obtained as output code data. By doing so, the code data are put together as a single piece of data in the "linking" process of the code data in accordance with the specified process based on the relation information stored separately in a plurality of two-dimensional codes, making it possible to store even a large piece of data that cannot be stored using a single two-dimensional code, and to expand the usage possibilities of the two-dimensional code.

FIG. 28 is a diagram depicting the setting of reference coordinates in the code image processing method according to the second embodiment of the present invention. When the recognition of the two-dimensional code has been successful, position information stored in the two-dimensional code is read out first. The position (relative position) information is described in the coordinate system of which reference coordinates, namely the origin of coordinates, is a feature point (here, the lower left vertex) in the two-dimensional code, and in which the directions (here, the left border and lower border) of the two-dimensional code are used as the axes (the Y-axis is the left border heading upward, the X-axis is the lower border heading in the scanning direction) of the coordinates, on the basis of the quantity or amount of a given feature (here, the size of a cell 105 in the two-dimensional code) with respect to the size of the two-dimensional code. In FIG. 27, the relative position information of the second two-dimensional code 500 viewed from the first two-dimensional code 400 is described as "(–400, –600)," where one unit is the size of a single cell and in consideration of the orientation of the coordinates. By doing so, the position (relative position) information can be described without the influence of factors such as the size and tilt of image data. While it is obviously possible to describe it with a feature point outside the two-dimensional code, another process for recognizing the reference coordinates is required in this case.

Next, in accordance with the position (relative position information), the position of the related second two-dimensional code 500 is obtained. Since the position of the second two-dimensional code 500 in the coordinate system can be understood in the same way as in the lower left part of the image data according to the position information stored in the first two-dimensional code 400, the code recognition of the second two-dimensional code 500 can be immediately performed. Therefore, since the search is performed one small block area at a time and therefore the block judgment process and the code recognition process can be omitted in the block area between the two two-dimensional codes, the process speed can be increased. In addition, the recognition accuracy is improved since the positions of related two-dimensional codes can be accurately recognized using the position (relative position) information.

In addition, the two two-dimensional codes can be recognized at a high speed with the procedure above in the case in which the scan of one small block area at a time starts from the lower left; this is done by storing, in the second two-dimensional code 500 also, the position (relative position) information of the first two-dimensional code 400 viewed from the second two-dimensional code 500 as the position (relative position) information.

When the recognition of the first two-dimensional code 400 and the second two-dimensional code 500 has been successful, information is processed on the basis of the methods stored in both of the two-dimensional codes. Here, the process method of "linking" and outputting code data 1 with code data 2 is specified. The code data read out from the two-dimensional code 400 is linked with the code data read out from the two-dimensional code 500, and is outputted as a single piece of code data. Thus, the data code can be appropriately processed without separate instructions as to the process method. In addition, even a piece of code data that cannot be expressed using a single two-dimensional code can be stored and processed by dividing it into a plurality of two-dimensional codes, which further expands the usage possibilities of the two-dimensional code.

Figure 29:
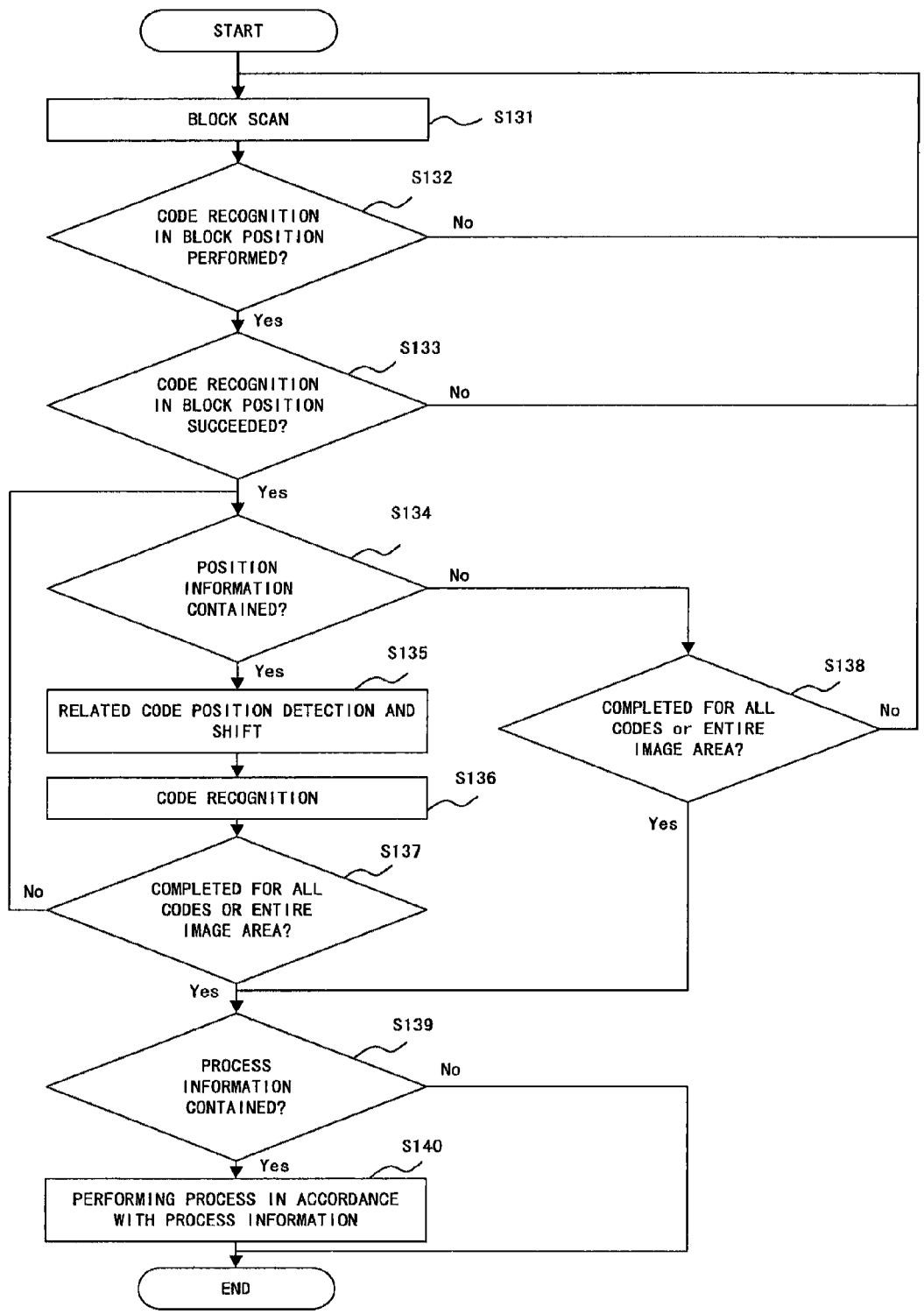
FIG. 29 is a flowchart depicting the code image processing method according to the second embodiment of the present invention.

FIG. 29 is a flowchart depicting the code image processing method according to the second embodiment of the present invention. In FIG. 29, the block scan is started and continued (S131) until a code recognition is performed in a block position (S132). When the code recognition in the block position has been successful (S133), the code data stored there is analyzed, and whether it contains position information of another related code is determined (S134). When it contains position information of another related code, a shift to the position indicated by the position information is conducted (S135) and the code recognition is performed (S136). When it does not contain position information of another related code, the block scan is continued as before (S138). When the search is completed in the entire area of the target image data (S137), whether the recognized code contains process information is determined (S139). When process information is contained in the recognized code, the process in accordance with the information is performed (S140).

[Third Embodiment]

FIG. 30 is a diagrammatic illustration of a code image processing method according to the third embodiment of the present invention. The difference between the code image processing method according to the third embodiment shown in FIG. 30 and the code image processing method according to the second embodiment shown in FIG. 27 is that the third embodiment is configured so that a two-dimensional code area in image data can be specified using the operation of a pointing device such as a mouse. The descriptions of other aspects of the embodiment are omitted here, since they are similar to the ones described in FIG. 27.

Figure 31:
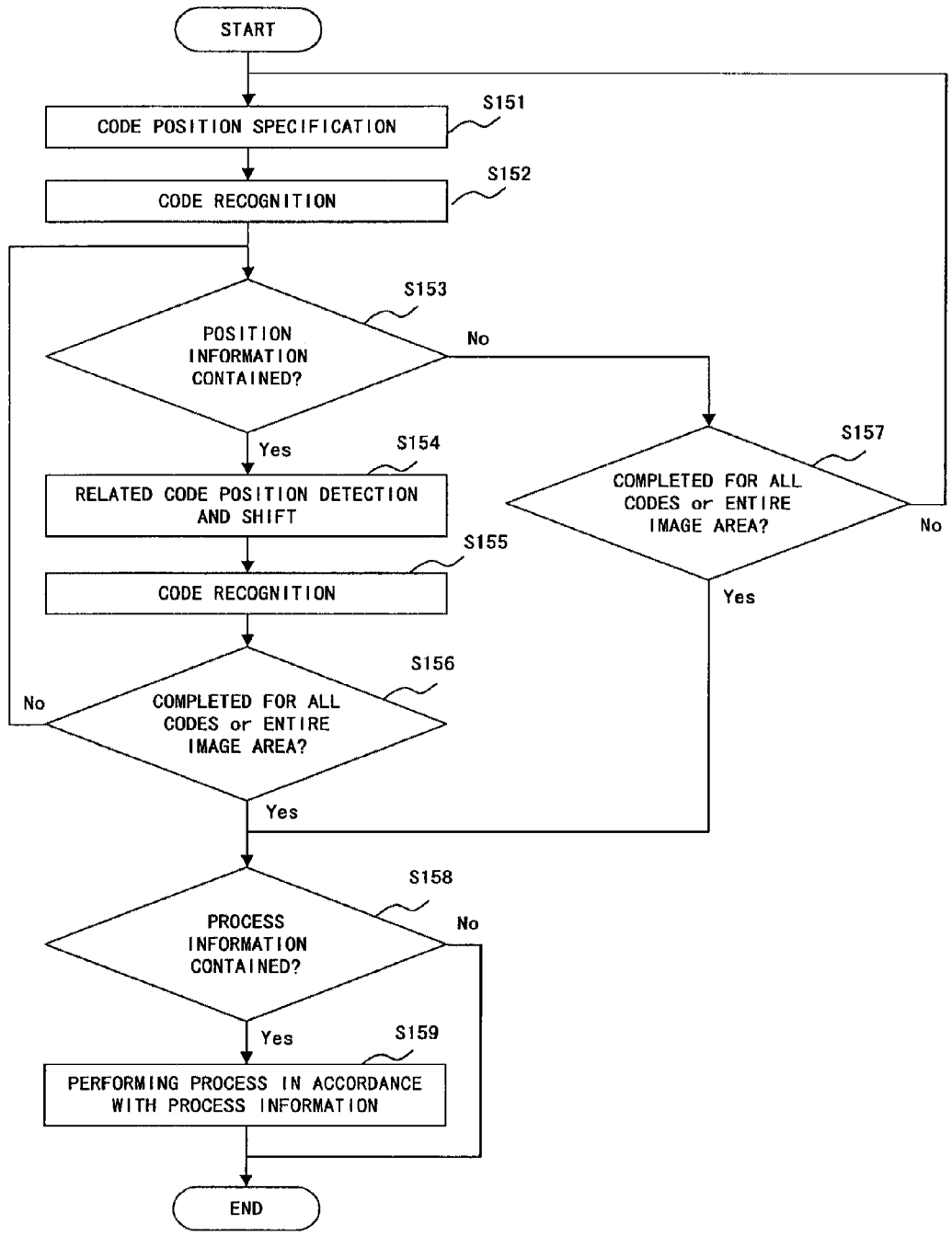
FIG. 31 is a flowchart depicting the code image processing method according to the third embodiment of the present invention.

FIG. 31 is a flowchart depicting the code image processing method according to the third embodiment of the present invention. In image data in FIG. 31, the position of a two-dimensional code in the image data, for example a first two-dimensional code 400, is specified (S151) first, using a given method, for example operation with a pointing device such as a mouse. Next, when the recognition of the first two-dimensional code 400 has been successful (S152), the code data stored there is analyzed, and whether it contains position information of another related two-dimensional code, for example a second two-dimensional code 500, is determined (S153). When it contains position information of a two-dimensional code, a shift to the position indicated by this position information is conducted (S154), and recognition of the two-dimensional code is performed (S155). When it does not contain position information of a two-dimensional code, the position of another two-dimensional code is specified (S157). When the recognition of all the two-dimensional codes contained in the target image data is completed (S156), whether the recognized two-dimensional code contains process information is checked (S158). When the two-dimensional code contains process information, the process in accordance with the information is performed (S159).

The details of the code image processing methods according to the present invention have been described above. A code reading device to perform the methods can obviously be configured with a well-known computer system as its main component.

FIG. 32 is a diagram depicting the loading of a program according to the present invention into a computer. In FIG. 32, the computer system comprises a central processing unit (CPU) 10, a read-only memory (ROM) 11, a random access memory (RAM) 12, a communication interface 13, a storage unit 14, an input/output unit 15, a recording medium reading unit 16, and a bus 17 to which all of them are connected.

Various types of storage units such as a hard disk and a magnetic disk can be used as the storage unit 14. The execution by the CPU 10 of the program stored in the storage unit 14 or ROM 11, or in the medium shown in the flowchart in FIGS. 8 to 11, FIGS. 23 to 26, FIG. 29, and FIG. 31, enables the detection of the blocks containing codes including one-dimensional/two-dimensional codes, the determination of the code type, and the recognition of the code according to this embodiment.

The program can be stored in the storage unit 14 by an information provider 18 via a network 19 and the communication interface 13, or can be stored in a commercially offered and distributed recording medium 20, set in the reading unit 16 and executed by the CPU 10.

According to the code image processing methods of the present invention, even when image data contains a plurality of codes, the code determination process and code recognition process in a recognized area are skipped without stopping when a code recognition is performed, and the search and recognition of all codes can be accurately performed. Therefore, the usage pattern of the code can be expanded since a plurality of two-dimensional codes of any number, position and size can be placed and used on a single document.

What is claimed is:

1. A code image processing method for decoding image data including codes by scanning the image data for each rectangular block, the code image processing method comprising:
   a block selection process selecting the rectangular block from the image data;
   a block judgment process judging whether the selected block satisfies a predetermined condition;
   a code determination process determining the type and properties of a code contained in the block satisfying the predetermined condition;
   a decode process decoding the code of which type and properties are determined; and
   a block scan control process controlling procedure to select the rectangular block in the block selection process using the decoded result, wherein the block scan control process skips the rectangular blocks including a first code decoded by the decode process and continues the scanning for a second code.

2. The code image processing method according to claim 1, wherein
   the decode process comprises a code area extraction process extracting a code area.

3. The code image processing method according to claim 2, wherein
   the code area extraction process comprises:
   a detection process of coordinates within a code;
   a cell size detection process; and
   a code boundary detection process.

4. The code image processing method according to claim 1, wherein
   the decode process comprises:
   a code relation information recognition process recognizing code relation information stored in the code; and
   a code relation information processing process performing a process using the recognized code relation information.

5. The code image processing method according to claim 4, wherein
   the code relation information comprises position information indicating a position relationship with another code, and
   the code relation information processing process comprises a code position shift process shifting a code position to be recognized, in accordance with the position information.

6. The code image processing method according to claim 5, wherein
   the position information comprises relative position information indicating a position relationship with another code or a plurality of other codes; and
   said method further comprises a decode position determination process determining an order of recognized related position information and a position to which a shift is conducted using previous recognition results.

7. A non-transitory computer readable medium recording a program for causing a computer to execute a process for decoding image data including codes by scanning the image data for each rectangular block, the process comprising:
   selecting the rectangular block from the image data;
   judging whether the selected block satisfies a predetermined condition;

determining the type and properties of a code contained in the block satisfying the predetermined condition;

decoding the code of which type and property are determined; and controlling a procedure to select the rectangular block in the block selection process using the decoded result, wherein the rectangular blocks including a first code which has been decoded are skipped and the scanning is continued for a second code.

* * * * *